(12) United States Patent
Mochizuki et al.

(10) Patent No.: US 6,538,965 B2
(45) Date of Patent: Mar. 25, 2003

(54) OPTICAL DISC, INFORMATION RECORDING APPARATUS AND INFORMATION REPRODUCING APPARATUS THEREFOR

(75) Inventors: Masaki Mochizuki, Yokohama (JP); Atsushi Hayami, Yokohama (JP)

(73) Assignee: Victor Company of Japan, Ltd., Yokohama (JP)

( * ) Notice: Subject to any disclaimer, the term of this patent is extended or adjusted under 35 U.S.C. 154(b) by 151 days.

(21) Appl. No.: 09/796,521

(22) Filed: Mar. 2, 2001

(65) Prior Publication Data

US 2001/0026515 A1 Oct. 4, 2001

(30) Foreign Application Priority Data

| Mar. 6, 2000 | (JP) | ........................................ 2000-060018 |
| Aug. 30, 2000 | (JP) | ........................................ 2000-260483 |

(51) Int. Cl.$^7$ ................................................. G11B 7/00
(52) U.S. Cl. ................ 369/47.22; 369/59.1; 369/59.25; 369/275.4
(58) Field of Search ............................ 369/47.1, 47.15, 369/47.16, 47.21, 47.22, 47.41, 53.1, 53.44, 59.1, 59.19, 59.23, 59.25, 275.1, 275.3, 275.4

(56) References Cited

U.S. PATENT DOCUMENTS 6,229,786 B1 * 5/2001 Miyamoto et al. ........ 369/275.4
6,487,147 B2 * 11/2002 Miyagawa et al. ........ 369/44.26

FOREIGN PATENT DOCUMENTS

| JP | 9-17029 | 1/1997 |
| JP | 9-326138 | 12/1997 |
| JP | 10-91967 | 4/1998 |
| JP | 10-255330 | 9/1998 |

* cited by examiner

Primary Examiner—Muhammad Edun
(74) Attorney, Agent, or Firm—Louis Woo

(57) ABSTRACT

An optical disc has an information recording portion. The information recording portion has a spiral of a groove, and land portions located between portions of the groove which neighbor each other as viewed in a disc radial direction. Auxiliary information used when an information signal is recorded on and reproduced from the groove is previously recorded on the land portions. The auxiliary information is represented by pre-pits provided in the land portions. The information recording portion is divided into a plurality of zones as viewed in the disc radial direction. In each of the zones, at least one of two sides of the groove wobbles at a fixed frequency in accordance with a constant angular velocity system. In each of the zones, phases of wobbles of respective neighboring portions of the groove are equal to each other.

18 Claims, 11 Drawing Sheets

OPTICAL DISC, INFORMATION RECORDING APPARATUS AND INFORMATION REPRODUCING APPARATUS THEREFOR

BACKGROUND OF THE INVENTION

1. Field of the Invention

This invention relates to an optical disc such as a phase change optical disc or a magneto-optical disc. In addition, this invention relates to an apparatus for recording a digital information signal on an optical disc. Furthermore, this invention relates to an apparatus for reproducing a digital information signal from an optical disc. Also, this invention relates to an apparatus for recording and reproducing a digital information signal on and from an optical disc.

2. Description of the Related Art

A DVD-RW (DVD Rewritable) has a disc member formed with a spiral of a wobbling groove on and from which main information can be recorded and reproduced. The disc member has land portions between neighboring groove portions. A groove portion and a pair of land portions adjoining the groove portion compose a track portion. Auxiliary information (a land pre-pit signal) is previously recorded on the land portions. Specifically, the auxiliary information is represented by land pre-pits formed in the land portions.

Japanese patent application publication number 9-326138 discloses an optical disc formed with wobbling grooves and pits (land pre-pits). The pits are located in an area between the grooves, and are spaced at a prescribed interval. During the recording of a signal on the disc or the reproduction of a signal therefrom, rotation of the disc is controlled in response to a wobble signal detected from the grooves. In addition, the position of a point on the disc is detected from a pit signal (a land pre-pit signal) derived from the pits.

The DVD-RW and the optical disc in Japanese patent application publication number 9-326138 are subjected to CLV (constant linear velocity) control during signal recording or signal reproduction. The CLV control causes the following problems.

(1) The phases of neighboring wobbles become opposite at some places. At these places, the cross-talks between a desired signal reproduced from the currently-scanned track and signals on tracks neighboring the currently-scanned track are relatively great. Accordingly, these places have a bad influence on signal recording. The quality of a land pre-pit signal reproduced from these places tends to be relatively low.

(2) In the case of data seek which requires an optical head to move radially of the disc for a large distance, a long time is taken until the rotational speed of the disc falls into a suitable range.

(3) If land pre-pits along neighboring tracks had equal phases, signal reproduction could be unavailable. Accordingly, it is necessary to design land pre-pits along neighboring tracks to have different phases.

Japanese patent application publication number 10-255330 discloses an optical disc having wobbling grooves which are designed to equalize the phases of the wobbles of neighboring grooves. The optical disc in Japanese patent application publication number 10-255330 can solve the above-indicated problem (1).

SUMMARY OF THE INVENTION

It is a first object of this invention to provide an improved optical disc.

It is a second object of this invention to provide an improved apparatus for recording a digital information signal on an optical disc.

It is a third object of this invention to provide an improved apparatus for reproducing a digital information signal from an optical disc.

It is a fourth object of this invention to provide an improved apparatus for recording and reproducing a digital information signal on and from an optical disc.

A first aspect of this invention provides an optical disc having an information recording portion, the information recording portion having a spiral of a groove, the information recording portion having land portions located between portions of the groove which neighbor each other as viewed in a disc radial direction, wherein auxiliary information used when an information signal is recorded on and reproduced from the groove is previously recorded on the land portions, wherein the auxiliary information is represented by pre-pits provided in the land portions, wherein the information recording portion is divided into a plurality of zones as viewed in the disc radial direction, wherein in each of the zones, at least one of two sides of the groove wobbles at a fixed frequency in accordance with a constant angular velocity system, and wherein in each of the zones, phases of wobbles of respective neighboring portions of the groove are equal to each other, and the neighboring portions of the groove neighbor each other as viewed in the disc radial direction.

A second aspect of this invention is based on the first aspect thereof, and provides an optical disc wherein the pre-pits are at positions having approximately a fixed relation with a period of the wobble of the groove, wherein groups each having a predetermined number of pre-pit locations represent bit data values containing addresses of the zones, and wherein a pre-pit is present in or absent from each of the pre-pit locations.

A third aspect of this invention is based on the second aspect thereof, and provides an optical disc wherein the groups in first one of the land portions are at first positions, and the groups in second one of the land portions are at second positions, wherein the first one of the land portions and the second one of the land portions neighbor each other as viewed in the disc radial direction, and wherein a phase of the first positions differ from a phase of the second positions as viewed along a disc circumferential direction.

A fourth aspect of this invention is based on the second aspect thereof, and provides an optical disc wherein the groups have first groups each representing a bit data value of "1" and second groups each representing a bit data value of "0", wherein each of the first groups and each of the second groups are equal in number of pre-pits per group, and wherein each of the first groups and each of the second groups are different in arrangement of pre-pits per group.

A fifth aspect of this invention is based on the first aspect thereof, and provides an optical disc wherein the frequency "fw" of the wobble of the groove and a channel bit clock frequency "fp" of the information signal are in a relation as follows:

$$fp = N \cdot fw$$

where N denotes a natural number.

A sixth aspect of this invention is based on the first aspect thereof, and provides an optical disc wherein as the zone changes from one to the next in a disc radially outward direction, a number of cycles of the wobble increases by a predetermined natural number and an amount of the information signal increases by a predetermined number of recording units.

A seventh aspect of this invention is based on the first aspect thereof, and provides an optical disc wherein the each information recording portion is divided into a plurality of sectorial segments of equal angular sizes, and wherein as the zone changes from one to the next in a disc radially outward direction, a number of cycles of the wobble per sectorial segment increases by a predetermined natural number and an amount of the information signal per sectorial segment increases by a predetermined number of recording units.

An eighth aspect of this invention provides an apparatus for recording digital information on an optical disc having an information recording portion, the information recording portion having a spiral of a groove, the information recording portion having land portions located between portions of the groove which neighbor each other as viewed in a disc radial direction, wherein auxiliary information used when an information signal is recorded on and reproduced from the groove is previously recorded on the land portions, wherein the auxiliary information is represented by pre-pits provided in the land portions, wherein the information recording portion is divided into a plurality of zones as viewed in the disc radial direction, wherein in each of the zones, at least one of two sides of the groove wobbles at a fixed frequency "fw" in accordance with a constant angular velocity system, wherein in each of the zones, phases of wobbles of respective neighboring portions of the groove are equal to each other, and the neighboring portions of the groove neighbor each other as viewed in the disc radial direction, and wherein the wobble frequency "fw" and a channel bit clock frequency "fp" of the information signal are in a relation as follows:

$$fp=N \cdot fw$$

where N denotes a natural number. The apparatus comprises signal reproducing means for reproducing a signal from the optical disc to generate a reproduced signal; pre-pit reproducing means for detecting the pre-pits in response to the reproduced signal, and generating a pre-pit signal representative of the detected pre-pits; wobble reproducing means for detecting the wobble in response to the reproduced signal, and generating a wobble signal representative of the detected wobble; clock generating means for generating a recording clock signal in response to the pre-pit signal and the wobble signal; zone address generating means for generating zone address information representative of addresses of the zones in response to the pre-pit signal; and recording means for recording an information signal on the groove in synchronism with the recording clock signal and in response to the zone address information and a reference clock signal having a frequency related to the wobble frequency, wherein the recording of the information signal is in accordance with a constant angular velocity system in each of the zones.

A ninth aspect of this invention provides an apparatus for reproducing digital information from an optical disc having an information recording portion, the information recording portion having a spiral of a groove, the information recording portion having land portions located between portions of the groove which neighbor each other as viewed in a disc radial direction, wherein auxiliary information used when an information signal is recorded on and reproduced from the groove is previously recorded on the land portions, wherein the auxiliary information is represented by pre-pits provided in the land portions, wherein the information recording portion is divided into a plurality of zones as viewed in the disc radial direction, wherein in each of the zones, at least one of two sides of the groove wobbles at a fixed frequency "fw" in accordance with a constant angular velocity system, wherein in each of the zones, phases of wobbles of respective neighboring portions of the groove are equal to each other, and the neighboring portions of the groove neighbor each other as viewed in the disc radial direction, and wherein the wobble frequency "fw" and a channel bit clock frequency "fp" of the information signal are in a relation as follows:

$$fp=N \cdot fw$$

where N denotes a natural number. The apparatus comprises signal reproducing means for reproducing a signal from the optical disc to generate a reproduced signal; pre-pit reproducing means for detecting the pre-pits in response to the reproduced signal, and generating a pre-pit signal representative of the detected pre-pits; zone address generating means for generating zone address information representative of addresses of the zones in response to the pre-pit signal; and information reproducing means for reproducing an information signal from the groove in response to the zone address information and a reference clock signal having a frequency related to the wobble frequency, wherein the reproduction of the information signal is in accordance with a constant angular velocity system in each of the zones.

A tenth aspect of this invention provides an optical disc having an information recording portion, the information recording portion having concentric grooves, the information recording portion having lands located between the grooves, wherein auxiliary information used when an information signal is recorded on and reproduced from the grooves is previously recorded on the lands, wherein the auxiliary information is represented by pre-pits provided in the lands, wherein the information recording portion is divided into a plurality of zones as viewed in a disc radial direction, wherein in each of the zones, at least one of two sides of each of the grooves wobbles at a fixed frequency in accordance with a constant angular velocity system, and wherein in each of the zones, phases of wobbles of neighboring ones of the grooves are equal to each other.

An eleventh aspect of this invention provides an optical disc having an information recording portion, the information recording portion having a spiral of a groove, the information recording portion having land portions located between portions of the groove which neighbor each other as viewed in a disc radial direction, wherein auxiliary information used when an information signal is recorded on and reproduced from the groove is previously recorded on the land portions, wherein the auxiliary information is represented by pre-pits provided in the land portions, wherein the information recording portion is divided into a plurality of zones as viewed in the disc radial direction, wherein in each of the zones, at least one of two sides of the groove wobbles at a fixed frequency in accordance with a constant angular velocity system, and wherein in each of the zones, phases of wobbles of respective neighboring portions of the groove are equal to each other, and the neighboring portions of the groove neighbor each other as viewed in the disc radial direction, the optical disc further having at least one connection track extending in one of two neighboring zones among the zones and along a boundary between the two neighboring zones, the connection track including a portion among the portions of the groove and a land portion among the land portions, wherein the land portion in the connection track is devoid of pre-pits, and the portion of the groove in the connection track is equal in wobble cycle and wobble phase to portions of the groove in the zone containing the connection track.

A twelfth aspect of this invention is based on the eleventh aspect thereof, and provides an optical disc wherein the portion of the groove in the connection track includes at least one of a total reflection mirror region and a region representative of predetermined pit information.

A thirteenth aspect of this invention provides an apparatus for recording and reproducing digital information on and from an optical disc having an information recording portion, the information recording portion having a spiral of a groove, the information recording portion having land portions located between portions of the groove which neighbor each other as viewed in a disc radial direction, wherein auxiliary information used when an information signal is recorded on and reproduced from the groove is previously recorded on the land portions, wherein the auxiliary information is represented by pre-pits provided in the land portions, wherein the information recording portion is divided into a plurality of zones as viewed in the disc radial direction, wherein in each of the zones, at least one of two sides of the groove wobbles at a fixed frequency in accordance with a constant angular velocity system, and wherein in each of the zones, phases of wobbles of respective neighboring portions of the groove are equal to each other, and the neighboring portions of the groove neighbor each other as viewed in the disc radial direction, the optical disc further having at least one connection track extending in one of two neighboring zones among the zones and along a boundary between the two neighboring zones, the connection track including a portion among the portions of the groove and a land portion among the land portions, wherein the land portion in the connection track is devoid of pre-pits, and the portion of the groove in the connection track is equal in wobble cycle and wobble phase to portions of the groove in the zone containing the connection track. The apparatus comprises reproducing means for reproducing a signal from the optical disc to generate a reproduced signal; pre-pit detecting means for detecting a pre-pit signal from the reproduced signal, the pre-pit signal representing the pre-pits; pre-pit decoding means for decoding the pre-pit signal detected by the pre-pit detecting means into original pre-pit information; and connection track detecting means for detecting a connection track in response to the original pre-pit information generated by the pre-pit decoding means, and generating connection track information representative of the detected connection track.

A fourteenth aspect of this invention is based on the thirteenth aspect thereof, and provides an apparatus further comprising means for inverting a polarity of the pre-pit signal in response to the connection track information.

A fifteenth aspect of this invention provides an optical disc having an information recording portion, the information recording portion having concentric grooves, the information recording portion having lands located between the grooves, wherein auxiliary information used when an information signal is recorded on and reproduced from the grooves is previously recorded on the lands, wherein the auxiliary information is represented by pre-pits provided in the lands, wherein the information recording portion is divided into a plurality of zones as viewed in a disc radial direction, wherein in each of the zones, at least one of two sides of each of the grooves wobbles at a fixed frequency in accordance with a constant angular velocity system, and wherein in each of the zones, phases of wobbles of neighboring ones of the grooves are equal to each other, the optical disc further having at least one connection track extending in one of two neighboring zones among the zones and along a boundary between the two neighboring zones, the connection track including a groove among the grooves and a land among the lands, wherein the land in the connection track is devoid of pre-pits, and the groove in the connection track is equal in wobble cycle and wobble phase to the grooves in the zone containing the connection track.

A sixteenth aspect of this invention provides an apparatus for recording digital information on an optical disc having an information recording portion, the information recording portion having concentric grooves, the information recording portion having lands located between the grooves, wherein auxiliary information used when an information signal is recorded on and reproduced from the grooves is previously recorded on the lands, wherein the auxiliary information is represented by pre-pits provided in the lands, wherein the information recording portion is divided into a plurality of zones as viewed in a disc radial direction, wherein in each of the zones, at least one of two sides of each of the grooves wobbles at a fixed frequency "fw" in accordance with a constant angular velocity system, wherein in each of the zones, phases of wobbles of neighboring ones of the grooves are equal to each other, and wherein the wobble frequency "fw" and a channel bit clock frequency "fp" of the information signal are in a relation as follows:

$$fp = N \cdot fw$$

where N denotes a natural number. The apparatus comprises signal reproducing means for reproducing a signal from the optical disc to generate a reproduced signal; pre-pit reproducing means for detecting the pre-pits in response to the reproduced signal, and generating a pre-pit signal representative of the detected pre-pits; wobble reproducing means for detecting the wobble in response to the reproduced signal, and generating a wobble signal representative of the detected wobble; clock generating means for generating a recording clock signal in response to the pre-pit signal and the wobble signal; zone address generating means for generating zone address information representative of addresses of the zones in response to the pre-pit signal; and recording means for recording an information signal on the grooves in synchronism with the recording clock signal and in response to the zone address information and a reference clock signal having a frequency related to the wobble frequency, wherein the recording of the information signal is in accordance with a constant angular velocity system in each of the zones.

A seventeenth aspect of this invention provides an apparatus for reproducing digital information from an optical disc having an information recording portion, the information recording portion having concentric grooves, the information recording portion having lands located between the grooves, wherein auxiliary information used when an information signal is recorded on and reproduced from the grooves is previously recorded on the lands, wherein the auxiliary information is represented by pre-pits provided in the lands, wherein the information recording portion is divided into a plurality of zones as viewed in a disc radial direction, wherein in each of the zones, at least one of two sides of each of the grooves wobbles at a fixed frequency "fw" in accordance with a constant angular velocity system, wherein in each of the zones, phases of wobbles of neighboring ones of the grooves are equal to each other, and wherein the wobble frequency "fw" and a channel bit clock frequency "fp" of the information signal are in a relation as follows:

$$fp = N \cdot fw$$

where N denotes a natural number. The apparatus comprises signal reproducing means for reproducing a signal from the optical disc to generate a reproduced signal; pre-pit reproducing means for detecting the pre-pits in response to the reproduced signal, and generating a pre-pit signal representative of the detected pre-pits; zone address generating means for generating zone address information representative of addresses of the zones in response to the pre-pit signal; and information reproducing means for reproducing an information signal from the grooves in response to the zone address information and a reference clock signal having a frequency related to the wobble frequency, wherein the reproduction of the information signal is in accordance with a constant angular velocity system in each of the zones.

An eighteenth aspect of this invention provides an apparatus for recording and reproducing digital information on and from an optical disc having an information recording portion, the information recording portion having concentric grooves, the information recording portion having lands located between the grooves, wherein auxiliary information used when an information signal is recorded on and reproduced from the grooves is previously recorded on the lands, wherein the auxiliary information is represented by pre-pits provided in the lands, wherein the information recording portion is divided into a plurality of zones as viewed in a disc radial direction, wherein in each of the zones, at least one of two sides of each of the grooves wobbles at a fixed frequency in accordance with a constant angular velocity system, and wherein in each of the zones, phases of wobbles of neighboring ones of the grooves are equal to each other, the optical disc further having at least one connection track extending in one of two neighboring zones among the zones and along a boundary between the two neighboring zones, the connection track including a groove among the grooves and a land among the lands, wherein the land in the connection track is devoid of pre-pits, and the groove in the connection track is equal in wobble cycle and wobble phase to the grooves in the zone containing the connection track. The apparatus comprises reproducing means for reproducing a signal from the optical disc to generate a reproduced signal; pre-pit detecting means for detecting a pre-pit signal from the reproduced signal, the pre-pit signal representing the pre-pits; pre-pit decoding means for decoding the pre-pit signal detected by the pre-pit detecting means into original pre-pit information; and connection track detecting means for detecting a connection track in response to the original pre-pit information generated by the pre-pit decoding means, and generating connection track information representative of the detected connection track.

DETAILED DESCRIPTION OF THE INVENTION

A prior-art optical disc will be explained below for a better understanding of this invention.

Figure 1:
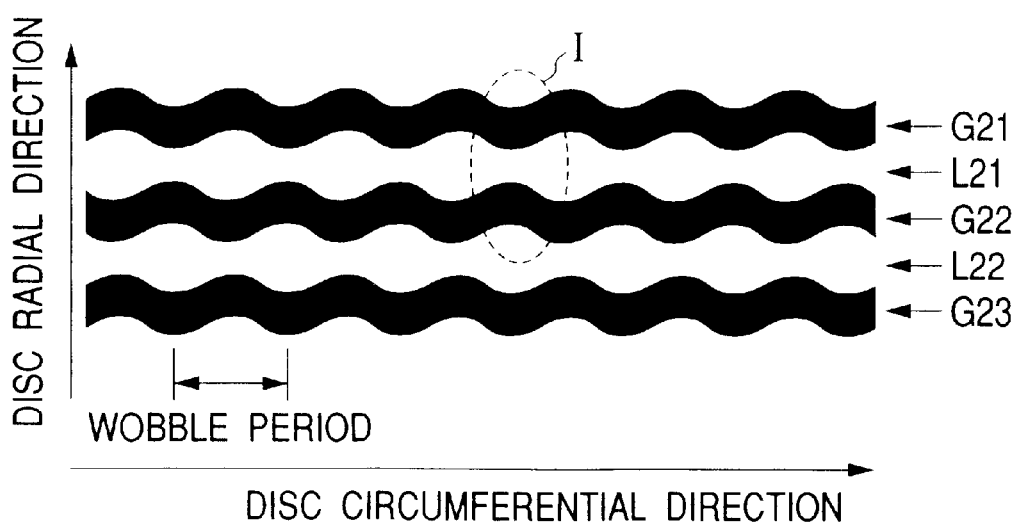
FIG. 1 is a diagram of a portion of a prior-art optical disc.

FIG. 1 shows a portion of a prior-art optical disc which has wobbling grooves G21, G22, and G23. A land L21 extends between the grooves G21 and G22. A land L22 extends between the grooves G22 and G23. The phases of the wobbles of the neighboring grooves G21 and G22 are opposite as denoted by "I". Also, the phases of the wobbles of the neighboring grooves G22 and G23 are opposite.

In the prior-art optical disc of FIG. 1, the distance between the neighboring grooves G21 and G22 (or G22 and G23) recurrently minimizes. At positions where the inter-groove distance minimizes, the cross-talk between a desired signal reproduced from a currently-scanned groove and a signal on a next groove is relatively large. The large cross-talk causes errors in reproduced data. The intensity of a land pre-pit signal reproduced from such large cross-talk positions tends to be insufficient. Accordingly, disc portions where the wobbles of neighboring grooves have opposite phases are not used for recording main information and auxiliary information (a land pre-pit signal). Thus, these disc portions are no good.

First Embodiment

An optical disc of a first embodiment of this invention has an information recording area formed with a spiral of a wobbling groove and a spiral of a land. A portion of the land is located between neighboring portions of the groove. A groove portion and a pair of land portions adjoining the groove portion compose a track portion. Alternatively, the optical disc may have a set of concentric circular wobbling grooves and lands formed between neighboring grooves. Main digital information can be recorded on and reproduced from the groove (or the grooves). Auxiliary digital information (pre-pit signals or land pre-pit signals) is previously recorded on the land (or the lands). Specifically, the auxiliary information is represented by pre-pits formed in the land (or the lands). The auxiliary information is used for the recording of main information on the optical disc or the reproduction of main information therefrom.

The information recording area of the optical disc is divided into concentric annular zones. The recording of a wobble (main information) on each of the zones is implemented on a CAV basis, that is, a constant angular velocity basis. For example, the angular velocity remains constant regardless of zone. The angular velocity may be varied from zone to zone. Accordingly, the optical disc is of a ZCLV (zone constant linear velocity) type or a ZCAV (zone constant angular velocity) type. In each of the zones of the optical disc, the wobbles of groove portions which neighbor each other as viewed in a radial direction of the disc have equal phases.

Figure 2:
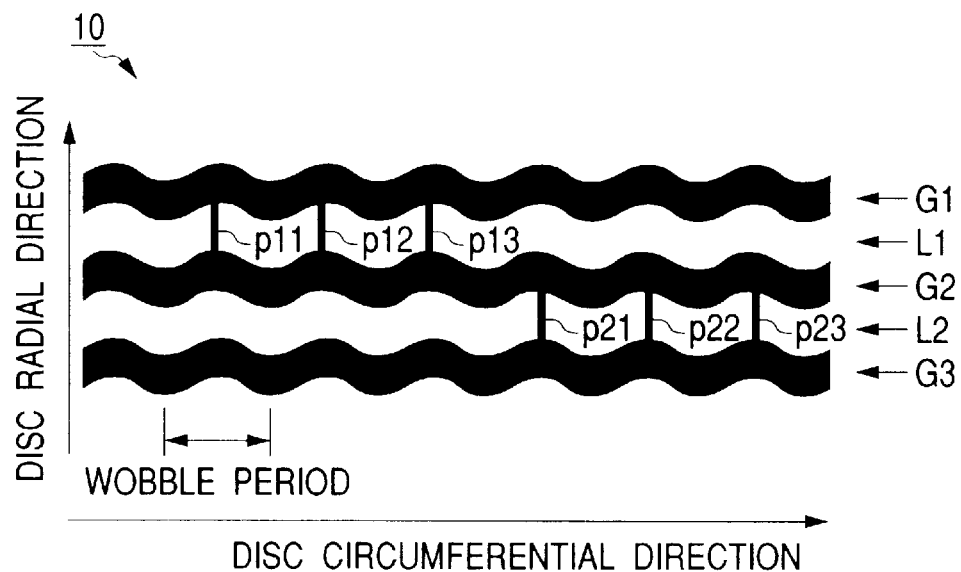
FIG. 2 is a diagram of a portion of an optical disc in a first embodiment of this invention.

FIG. 2 shows a portion of the optical disc 10 in the first embodiment of this invention. The optical disc 10 in FIG. 2 includes wobbling groove portions G1, G2, and G3 which extend in a common zone, and which neighbor each other as viewed in a radial direction of the disc. The two sides of each of the groove portions G1, G2, and G3 wobble. The optical disc 10 also includes land portions L1 and L2. The land portion L1 extends between the groove portions G1 and G2. The land portion L2 extends between the groove portions G2 and G3.

The land portion L1 is formed with groups each having prescribed locations (prescribed pre-pit locations) p11, p12, and p13 spaced at an interval equal to the period of the wobbles of the groove portions G1 and G2. The prescribed locations p11, p12, and p13 are assigned to pre-pits, respectively. As will be mentioned later, a pre-pit is present in or absent from each of the prescribed locations p11, p12, and p13. For example, the prescribed locations p11, p12, and p13 approximately coincide with positions at which the amplitude of the wobbles of the groove portions G1 and G2 peaks. Similarly, the land portion L2 is formed with groups each having prescribed locations p21, p22, and p23 spaced at an interval equal to the period of the wobbles of the groove portions G2 and G3. The prescribed locations p21, p22, and p23 are assigned to pre-pits, respectively. As will be mentioned later, a pre-pit is present in or absent from each of the prescribed locations p21, p22, and p23. For example, the prescribed locations p21, p22, and p23 approximately coincide with positions at which the amplitude of the wobbles of the groove portions G2 and G3 peaks.

The positions of the 3-pre-pit location groups on the land portion L1 are in a first phase along a circumferential direction of the disc. The positions of the 3-pre-pit location groups on the land portion L2 are in a second phase along the circumferential direction of the disc. The first phase and the second phase differ from each other. In other words, the circumferential positions (the angular positions) of the 3-pre-pit location groups on the land portion L1 differ from those of the 3-pre-pit location groups on the land portion L2. Specifically, the 3-pre-pit location groups on the land portion L1 alternate with the 3-pre-pit location groups on the land portion L2 as viewed in the circumferential direction of the disc.

The 3 prescribed locations in each of the groups represent 3 bits, respectively. A pre-pit is present in or absent from each prescribed location. The presence of a pre-pit in the prescribed location represents a bit of "1". The absence of a pre-pit from the prescribed location represents a bit of "0". A unit data piece of "1" and a unit data piece of "0" are represented by different states of 3 bits corresponding to one 3-pre-pit location group.

Other portions of the optical disc have 3-pre-pit location groups which are designed and arranged similarly to the previously-mentioned 3-pre-pit location groups. Specifically, 3-pre-pit location groups on a land portion alternate with 3-pre-pit location groups on a next land portion as viewed in the circumferential direction of the disc.

Since the wobbles of neighboring groove portions in a common zone of the optical disc have equal phases, the distance between the neighboring groove portions is prevented from excessively decreasing. Thus, it is possible to prevent the occurrence of considerable cross-talks between a desired signal reproduced from the currently-scanned groove portion and signals on groove portions adjoining the currently-scanned groove portion which would be caused by an excessively small distance between the neighboring groove portions. As previously mentioned, 3-pre-pit location groups on a land portion alternate with 3-pre-pit location groups on a neighboring land portion. Therefore, the 3-pre-pit location groups on the land portion are prevented from overlapping the 3-pre-pit location groups on the neighboring land portion as viewed in the circumferential direction of the disc. Thus, pre-pits in the optical disc can be accurately detected.

Figure 3:
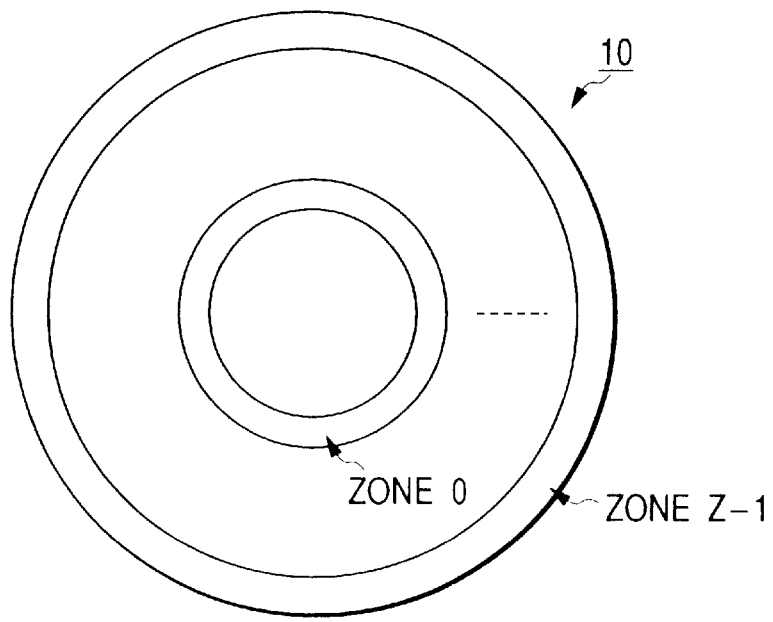
FIG. 3 is a diagram of the optical disc in the first embodiment of this invention.

With reference to FIG. 3, the information recording area of the optical disc is divided into concentric annular zones serially numbered as "0", "1", . . . , and "Z-1", where Z denotes a predetermined natural number. Here, the numbers "0", "1", . . . , and "Z-1" indicate the addresses of the zones, respectively. In each of the zones, the wobbles of groove portions and 3-pre-pit location groups on land portions are designed as previously mentioned. In the case of the optical disc having an outside diameter of 12 cm, each zone is composed of 1,024 tracks (corresponding to 1,024 neighboring groove portions as viewed in the radial direction of the disc), and the zone number Z is equal to, for example, 83.

Figure 4:
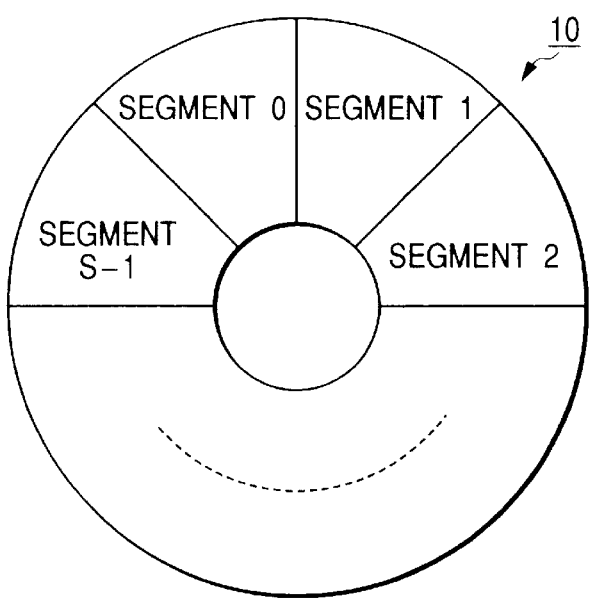
FIG. 4 is a diagram of the optical disc in the first embodiment of this invention.

As shown in FIG. 4, the information recording area of the optical disc is divided into sectorial segments of equal angular sizes which are serially numbered as "0", "1", . . . , and "S-1", where S denotes a predetermined natural number. Here, the numbers "0", "1", . . . , and "S-1" indicate the addresses of the sectorial segments, respectively. In the case of the optical disc having an outside diameter of 12 cm, a recording-area inside radius of 24 mm, and a track pitch (an inter-groove-portion distance) of about 0.4 $\mu$m, the segment number S is equal to 13.

Regardless of ZCLV or ZCAV and throughout the information recording area of the optical disc, the wobble frequency "fw" and the channel bit clock frequency "fp" of main information recorded on the optical disc are set to satisfy the following relation.

$$fp = N \cdot fw \qquad (1)$$

where N denotes a natural number.

Conditions of the innermost zone of the optical disc are set as follows. In the case where the channel bit clock frequency "fp" for the innermost zone of the optical disc is equal to 73.05 MHz and the natural number N is equal to 279, the equation (1) shows that the wobble frequency "fw" is equal to about 262 kHz. Furthermore, parameters are set as follows. One sector is composed of 36,270 channel bits. A run-length limited code RLL(2, k) is used which corresponds to 3 channel bits for a shortest mark, where "k" denotes a predetermined natural number greater than 2. The rotational speed of the optical disc which occurs when the innermost circumference of the information recording area of the optical disc is being scanned is set to about 34.73 rps.

The shortest recording wavelength which occurs in the innermost circumference (a radius "r" of 24 mm) of the information recording area of the optical disc is set to about 0.215 $\mu$m. The number of channel bits per track (that is, per circle or turn of the track) is given as "$2\pi r/(WLmin/3)$", where WLmin denotes the shortest recording wavelength. Therefore, under these settings, the number SN of sectors per track (that is, per circle or turn of the track) is expressed by the following equations.

SN = (the number of channel bits per track)/(the number of channel bits per sector)
= {$2\pi r/(WLmin/3)$}/(the number of channel bits per sector)
= ($2\pi \cdot 24 \cdot 10^{-3} \cdot 3/(0.215 \cdot 10^{-6})$)/36270
= 58

Thus, the number of sectors per track in the innermost zone of the optical disc is equal to 58.

In the case where one sector is composed of 26 recording blocks, one segment corresponds to 116 (=26·58/13) recording blocks for the innermost zone of the optical disc. Since the wobble frequency "fw" is equal to about 262 kHz and one revolution of the optical disc in a time interval of 1/34.73 second corresponds to 13 segments, the number of wobbles (the number of wobble periods or cycles) per segment is equal to 580 given by $262 \cdot 10^3/(34.73 \cdot 13)$. Thus, the number of wobble cycles per segment in the innermost zone of the optical disc is equal to 580. The number of wobble cycles per sector in the innermost zone of the optical disc is equal to 10.

Regarding each of the zones of the optical disc, as the diameter of a circumference increases, the circumference lengthens and hence the shortest mark length increases. On the other hand, the shortest mark lengths which occur in the innermost circumferences of the respective zones of the optical disc are set approximately equal. Accordingly, as the zone changes from one to the next in the radially outward direction of the optical disc, the amount of information recorded per track (per circle or turn of the track) increases by a value corresponding to one sector. Thus, in the zone of the optical disc which extends immediately outward of the innermost zone, information corresponding to 59 sectors can be recorded per track (per circle or turn of the track), and one segment corresponds to 118 (=26·59/13) recording blocks and the number of wobble cycles per segment is equal to 590.

The previously-indicated equation (1) indicates that the channel bit clock frequency "fp" is proportional to the wobble frequency "fw", and the constant of proportion is equal to the natural number N. As the zone changes from one to the next in the radially outward direction of the optical disc, the number of wobble cycles per segment increases by 10 and the amount of information recorded per segment increases by a value in unit of recording blocks.

Figure 5:
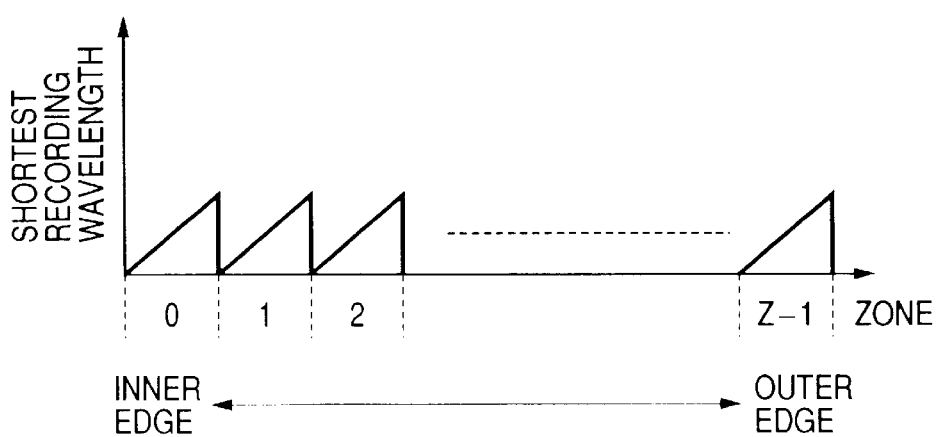
FIG. 5 is a diagram of the relation between the shortest recording wavelength and an on-disc position in first embodiment of this invention.

With reference to FIG. 5, the shortest recording wavelength increases from a minimum value to a maximum value as a related position on the optical disc moves radially outward from the innermost circumference of each zone ("0", "1", ..., or "Z-1") to the outermost circumference thereof. The shortest recording lengths which occur in the innermost circumferences of the respective zones of the optical disc are approximately equal. Also, the shortest recording lengths which occur in the outermost circumferences of the respective zones of the optical disc are approximately equal. Accordingly, the shortest recording wavelength varies in a sawtooth shape as a related position on the optical disc moves radially outward from the innermost circumference of the optical disc to the outermost circumference thereof. The CAV information recording on each of the zones provides the sawtooth variation in the shortest recording wavelength. In the case where the angular velocity remains constant regardless of zone, the whole of the optical disc is driven on a ZCAV basis. On the other hand, in the case where the angular velocity is varied from zone to zone, the whole of the optical disc is driven on a ZCLV basis.

Figure 6:
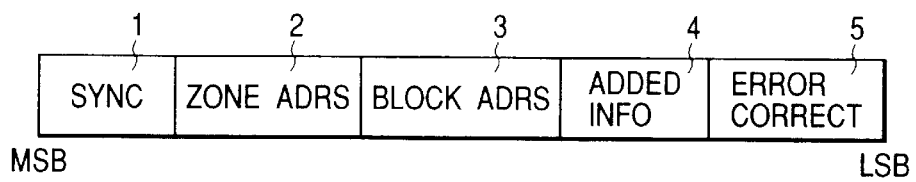
FIG. 6 is a diagram of the format of a land pre-pit signal in the first embodiment of this invention.

FIG. 6 shows the format of one land pre-pit signal recorded on the optical disc. As previously mentioned, groups each having 3 prescribed locations (p11–p13 or p21–p23 in FIG. 2) are recorded on each land portion between neighboring groove portions in the optical disc. The 3 prescribed locations in each group represent 3 bits, respectively. Thus, each group corresponds to a sequence of 3 bits. A pre-pit is present in or absent from each prescribed location. The presence of a pre-pit in the prescribed location represents a bit of "1". The absence of a pre-pit from the prescribed location represents a bit of "0". The 3-pre-pit location groups on the land portions represent land pre-pit signals recorded on the optical disc.

As shown in FIG. 6, one land pre-pit signal has a sequence of a pre-pit sync signal 1, a zone address signal 2, a block address signal 3, an added information signal 4, and an error correction code signal 5. Each land pre-pit signal results from subjecting an original signal to a predetermined modulation process. A disc maker previously records the land pre-pit signal on the optical disc.

The pre-pit sync signal 1 is designed to enable a recording apparatus or a reproducing apparatus to detect the recorded position of the related land pre-pit signal on the optical disc. The zone address signal 2 indicates which of the zones "0", "1", ..., and "Z-1" the related on-disc position exists in. The block address signal 3 indicates recording block positions in each segment. The added information signal 4 contains information for controlling laser power and information indicative of a disc serial number. The error correction code signal 5 is used in correcting an error or errors in the reproduction of the related land pre-pit signal.

For example, the pre-pit sync signal 1 is assigned to a 3-bit sequence of "111" represented by a 3-pre-pit location group. A unit data piece of "1", that is, a unit data bit of "1", is assigned to a 3-bit sequence of "110" represented by a 3-pre-pit location group. A unit data piece of "0", that is, a unit data bit of "0", is assigned to a 3-bit sequence of "101" represented by a 3-pre-pit location group.

A unit data bit of "1" and a unit data bit of "0" are equal in number of existing pre-pits in a 3-pre-pit location group. Thus, in the case where a signal is reproduced from the optical disc while push-pull tracking servo control is implemented, it is possible to prevent the occurrence of a servo offset which would be caused by the difference in number of pre-pits between right-hand and left-hand land portions along a track.

Figure 7:
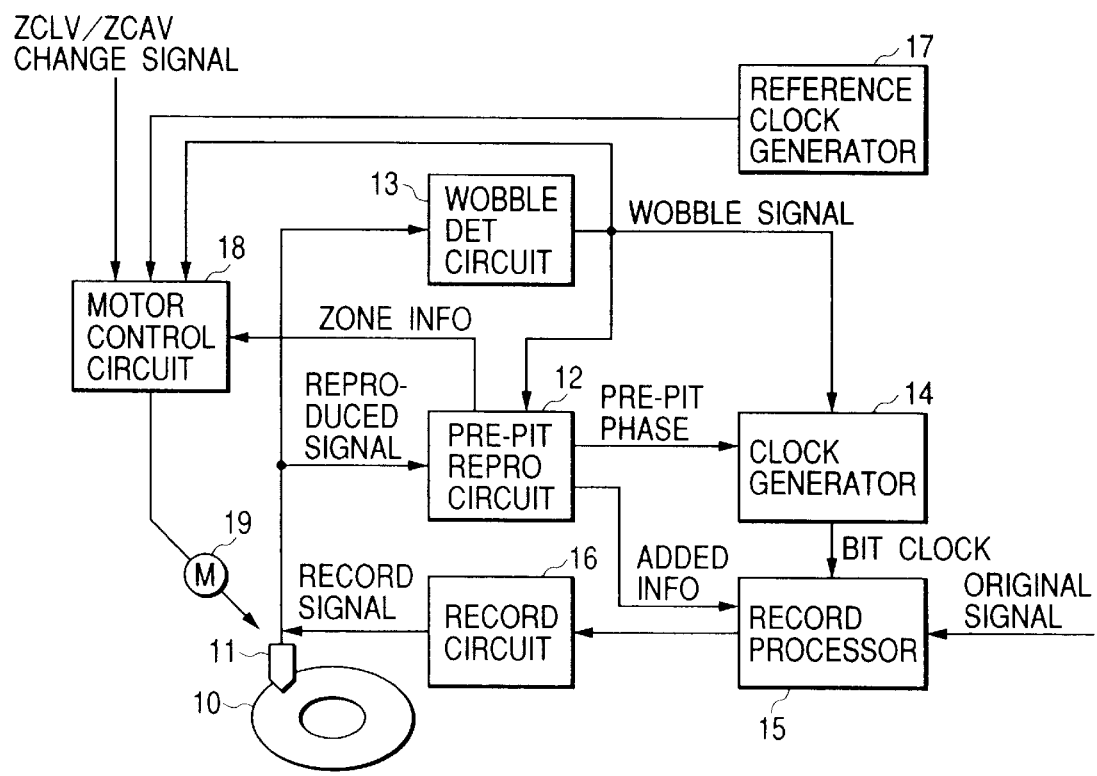
FIG. 7 is a block diagram of an information recording apparatus in the first embodiment of this invention.

FIG. 7 shows an apparatus for recording a signal on an optical disc 10 equal in structure and design to the optical disc of FIGS. 2–5. The recording apparatus in FIG. 7 includes an optical pickup 11 for applying a laser beam to the optical disc 10 to record a signal thereon. The laser beam is reflected by the optical disc 10 before returning to the optical pickup 11. The optical pickup 11 converts the return laser beam (the reflected laser beam) into a reproduced signal. The optical pickup 11 feeds the reproduced signal to a pre-pit reproducing circuit 12 and a wobble detecting circuit 13. The reproduced signal (shown in FIG. 7) differs from a record signal (a signal to be recorded) in frequency band. The pre-pit reproducing circuit 12 detects a pre-pit phase, a zone address signal, and an added information signal (shown in FIG. 6) from the reproduced signal. The wobble detecting circuit 13 detects a wobble signal from the reproduced signal. The wobble signal represents the wobble of the groove in the optical disc 10.

A clock generator 14 receives the wobble signal from the wobble detecting circuit 13. The clock generator 14 receives information of the pre-pit phase from the pre-pit reproducing circuit 12. The clock generator 14 includes, for example, a PLL (phase locked loop) circuit. The clock generator 14 produces a channel bit clock frequency signal in response to the wobble signal. The wobble signal has the wobble frequency "fw". The channel bit clock frequency signal has the channel bit clock frequency "fp" which is equal to "N·fw" as indicated by the equation (1). The clock generator 14 subjects the channel bit clock frequency signal to phase lock responsive to the pre-pit phase information, thereby generating a bit clock signal for signal recording. The clock generator 14 outputs the bit clock signal to a recording processor 15.

The recording processor 15 receives the added information signal from the pre-pit reproducing circuit 12. The recording processor 15 converts an original record signal (an original signal to be recorded) into digital record information through block encoding in response to the added information signal and the bit clock signal. The digital record information is of, for example, the RLL(2, k) code designed so that the minimum and maximum numbers of "0" between "1" will be equal to 2 and "k" respectively.

A recording circuit 16 receives the digital record information from the recording processor 15. The recording circuit 16 converts the digital record information into a final record signal of a predetermined recording format (shown in FIG. 8). The recording circuit 16 outputs the final record signal to the optical pickup 11. The optical pickup 11 generates the laser beam in response to the output signal of the recording circuit 16. The optical pickup 11 applies the laser beam to the optical disc 10, thereby recording the output signal of the recording circuit 16 on the optical disc 10. Accordingly, the digital record information is recorded on the optical disc 10.

Figure 8:
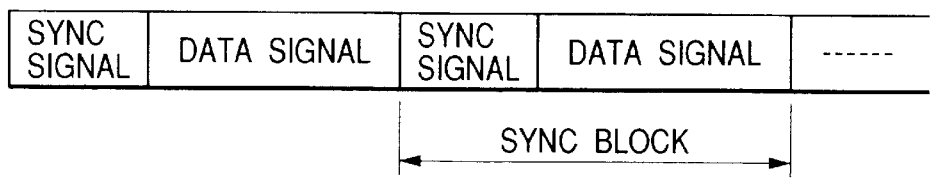
FIG. 8 is a diagram of the format of a record signal in the first embodiment of this invention.

FIG. 8 shows an example of the predetermined recording format for the final record signal. According to the example of the predetermined recording format in FIG. 8, the final record signal has a sequence of sync blocks (recording blocks) each having a sync signal and a data signal following the sync signal.

With reference back to FIG. 7, a reference clock signal generator 17 produces a reference clock signal having a frequency normally equal to the channel bit clock frequency "fp". The reference clock signal generator 17 outputs the reference clock signal to a motor control circuit 18.

The motor control circuit 18 receives a ZCLV/ZCAV change signal from a suitable external device (not shown). The motor control circuit 18 receives the zone address signal from the pre-pit reproducing circuit 12. The motor control circuit 18 receives the wobble signal from the wobble detecting circuit 13. The motor control circuit 18 generates a motor drive signal in response to the zone address signal, the reference clock signal, the ZCLV/ZCAV change signal, and the wobble signal. The motor control circuit 18 feeds the motor drive signal to a spindle motor 19 for rotating the optical disc 10. The spindle motor 19 is powered by the motor drive signal so that the optical disc 10 is rotated in response to the motor drive signal.

Figure 9:
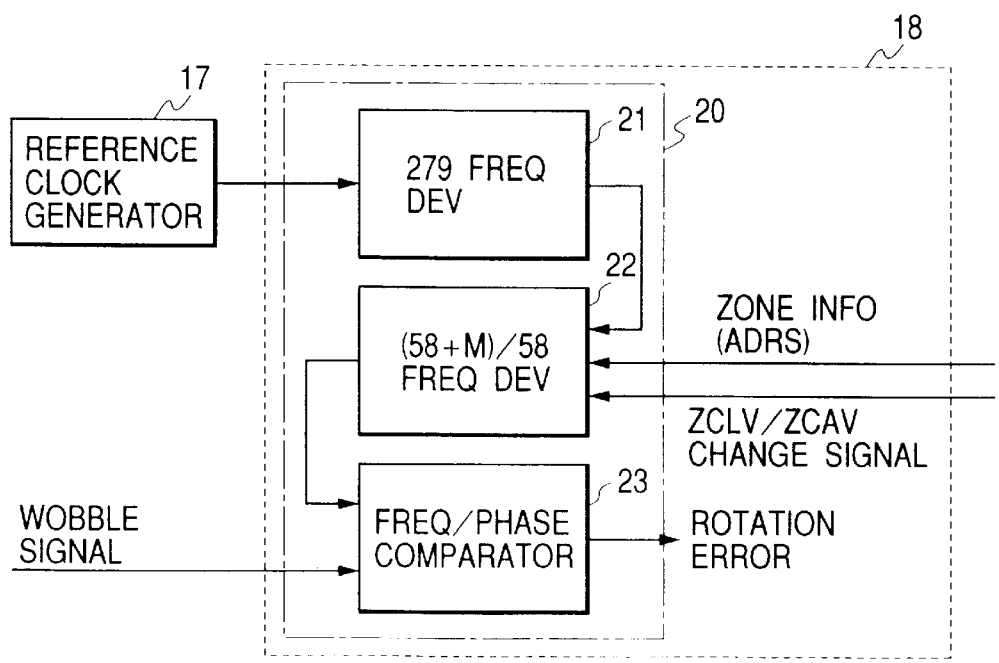
FIG. 9 is a diagram of a portion of a motor control circuit in FIG. 7.

As shown in FIG. 9, the motor control circuit 18 includes a ZCLV/ZCAV change circuit 20. The ZCLV/ZCAV change circuit 20 has a 279 frequency divider 21, a (58+M)/58 frequency divider 22, and a frequency/phase comparator 23. The 279 frequency divider 21 divides the frequency of the reference clock signal by 279 (the natural number N for the innermost zone), thereby generating a first frequency-division resultant signal having a frequency which is equal to the wobble frequency "fw" under normal conditions. The 279 frequency divider 21 outputs the first frequency-division resultant signal to the (58+M)/58 frequency divider 22.

The (58+M)/58 frequency divider 22 responds to the ZCLV/ZCAV change signal. In the case where the ZCLV/ZCAV change signal requires ZCLV, the (58+M)/58 frequency divider 22 sets a value M to 0. In this case, the (58+M)/58 frequency divider 22 passes the first frequency-division resultant signal to the frequency/phase comparator 23 as it is. The frequency/phase comparator 23 compares the first frequency-division resultant signal and the wobble signal in frequency and phase, and thereby detects frequency and phase errors between the two signals. The frequency/phase comparator 23 generates a rotation error signal representing the detected frequency and phase errors. The rotation error signal is transmitted from the frequency/phase comparator 23 to the spindle motor 19 via a drive circuit (not shown) in the motor control circuit 18. Thus, the rotation of the optical disc 10 is controlled in response to the rotation error signal. The rotation control of the optical disc 10 is designed so that the frequency and phase of the reproduced wobble signal will be kept in fixed relations with those of the reference clock signal. As a result, the signal recording on the optical disc 10 is implemented on a ZCLV basis.

In the case where the ZCLV/ZCAV change signal requires ZCAV, the (58+M)/58 frequency divider 22 sets the value M in response to the zone address signal. Specifically, the (58+M)/58 frequency divider 22 sets the value M to 0 when the zone address signal indicates the innermost zone. The (58+M)/58 frequency divider 22 updates and increments the value M by 1 when the zone indicated by the zone address signal changes from one to the next in the radially outward direction of the optical disc 10. The optical disc 10 is designed so that as the zone changes from one to the next in the radially outward direction of the optical disc 10, the number of sectors per track (per circle or turn of the track) increases by one. Accordingly, the (58+M)/58 frequency divider 22 divides the frequency of the first frequency-division resultant signal by (58+M)/58, thereby generating a second frequency-division resultant signal having a frequency which is equal to the wobble frequency "fw" under normal conditions. The value "(58+M)/58" means the ratio in per-track-turn wobble number between the zone of interest and the innermost zone, that is, the ratio in per-track-turn sector number between the zone of interest and the innermost zone. The (58+M)/58 frequency divider 22 outputs the second frequency-division resultant signal to the frequency/phase comparator 23. The frequency/phase comparator 23 compares the second frequency-division resultant signal and the wobble signal in frequency and phase, and thereby detects frequency and phase errors between the two signals. The frequency/phase comparator 23 generates a rotation error signal representing the detected frequency and phase errors. The rotation error signal is transmitted from the frequency/phase comparator 23 to the spindle motor 19 via the drive circuit in the motor control circuit 18. Thus, the rotation of the optical disc 10 is controlled in response to the rotation error signal. The rotation control of the optical disc 10 is designed so that the frequency and phase of the reproduced wobble signal will be changed in accordance with the zone-dependent per-track-turn wobble number (the zone-dependent per-track-turn sector number), and that the rotational speed of the optical disc 10 will be fixed at a constant value. As a result, the signal recording on the optical disc 10 is implemented on a ZCAV basis.

Figure 10:
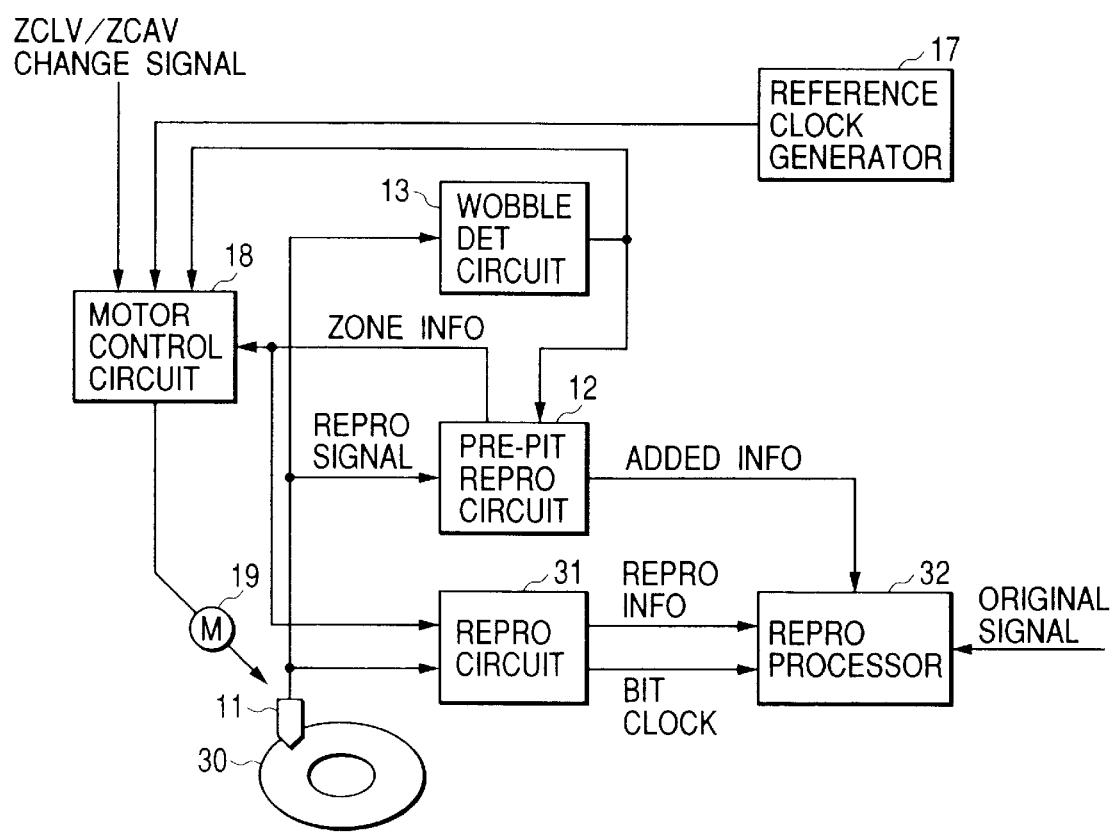
FIG. 10 is a block diagram of an information reproducing apparatus in the first embodiment of this invention.

FIG. 10 shows an apparatus for reproducing a signal from an optical disc 30 equal in structure and design to the optical disc of FIGS. 2–5. Digital information is recorded on a groove or grooves in the optical disc 30 as in the optical disc 10. The recorded digital information is of the predetermined recording format, for example, the format in FIG. 8.

The reproducing apparatus in FIG. 10 includes an optical pickup 11 for applying a laser beam to the optical disc 30. The laser beam scans the optical disc 30 along a track corresponding to the groove or grooves. The laser beam is reflected by the optical disc 30 before returning to the optical pickup 11. The optical pickup 11 converts the return laser beam (the reflected laser beam) into an electric signal. The optical pickup 11 processes the electric signal into a reproduced signal. The optical pickup 11 feeds the reproduced signal to a pre-pit reproducing circuit 12, a wobble detecting circuit 13, and a reproducing circuit 31. The pre-pit reproducing circuit 12 and the wobble detecting circuit 13 are similar to those in FIG. 7.

The reproducing apparatus in FIG. 10 further includes a reference clock signal generator 17, a motor control circuit 18, and a spindle motor 19 which are similar to those in FIG. 7. The spindle motor 19 acts to rotate the optical disc 30.

The reproducing circuit 31 is of a known type. The reproducing circuit 31 corrects conditions of the reproduced signal. The reproducing circuit 31 includes a PLL circuit which extracts a bit clock signal from the reproduced signal. The reproducing circuit 31 subjects the correction-resultant reproduced signal to a data decoding process to reproduce digital information. The reproducing circuit 31 feeds the bit clock signal and the reproduced digital information to a reproducing processor 32.

The reproducing processor 32 receives an added information signal from the pre-pit reproducing circuit 12. The reproducing processor 32 converts the reproduced digital information into an original signal through block decoding in response to the added information signal and the bit clock signal. Accordingly, the reproducing processor 32 recovers the original signal.

In the reproducing apparatus of FIG. 10, the motor control circuit 18 receives a ZCLV/ZCAV change signal which depends on whether the optical disc 30 is of a ZCLV type or a ZCAV type. When the ZCLV/ZCAV indicates that the optical disc 30 is of the ZCAV type, a zone address signal derived from the reproduced signal by the pre-pit reproducing circuit 12 may be fed to the reproducing circuit 31 to quicken the lockup of the PLL circuit in the reproducing circuit 31 to bit clock signal components of the reproduced signal. In this case, the rotational speed of the spindle motor 19 can be quickly equalized to a desired value even during data seek which requires the optical pickup 11 to move radially of the optical disc 30 for a large distance.

In each of the zones of the optical disc 30, the wobbles of groove portions which neighbor each other in the radial direction of the optical disc 30 have equal phases. Accordingly, during the signal reproduction from the optical disc 30, the cross-talks between a desired signal reproduced from the currently-scanned groove portion and signals on groove portions adjoining the currently-scanned groove portion can be kept minimal. Therefore, the quality of the reproduced signal can be high. In addition, a reproduced land pre-pit signal can be high in quality.

In the optical disc 30, 3-pre-pit location groups on a land portion alternate with 3-pre-pit location groups on a next land portion as viewed in the circumferential direction of the disc 30. Therefore, 3-pre-pit location groups on a land portion are prevented from overlapping 3-pre-pit location groups on a next land portion as viewed in the circumferential direction of the disc 30. Thus, pre-pits in the optical disc 30 can be accurately detected.

Second Embodiment

An optical disc in a second embodiment of this invention is similar to the optical disc of the first embodiment thereof except for the following design change. In the optical disc of the second embodiment of this invention, only one of the two sides of each groove portion wobbles.

Third Embodiment

An optical disc in a third embodiment of this invention is similar to the optical disc of the first embodiment thereof except that J-pre-pit location groups replace the 3-pre-pit location groups. Here, J denotes a predetermined natural number different from 3.

Fourth Embodiment

An optical disc in a fourth embodiment of this invention is similar to the optical disc of the first embodiment thereof except for the following design change. In the optical disc of the fourth embodiment of this invention, sets each having a plurality of 3-pre-pit location groups on a land portion alternate with sets each having a plurality of 3-pre-pit location groups on a next land portion as viewed in the circumferential direction of the disc.

Fifth Embodiment

An optical disc of a fifth embodiment of this invention has an information recording area formed with a spiral of a wobbling groove and a spiral of a land. A portion of the land is located between neighboring portions of the groove. A groove portion and a pair of land portions adjoining the groove portion compose a track portion. Alternatively, the optical disc may have a set of concentric circular wobbling grooves and lands formed between neighboring grooves. Main digital information can be recorded on and reproduced from the groove (or the grooves). Auxiliary digital information (pre-pit signals or land pre-pit signals) is previously recorded on the land (or the lands). Specifically, the auxiliary information is represented by pre-pits formed in the land (or the lands). The auxiliary information is used for the recording of main information on the optical disc or the reproduction of main information therefrom.

The information recording area of the optical disc is divided into concentric annular zones. The recording of a wobble (main information) on each of the zones is implemented on a CAV basis, that is, a constant angular velocity basis. For example, the angular velocity remains constant regardless of zone. The angular velocity may be varied from zone to zone. Accordingly, the optical disc is of a ZCLV (zone constant linear velocity) type or a ZCAV (zone constant angular velocity) type. In each of the zones of the optical disc, the wobbles of groove portions which neighbor each other as viewed in a radial direction of the disc have equal phases.

Generally, in the fifth and later embodiments of this invention, an optical disc is not divided into sectorial segments of equal angular sizes as shown in FIG. 4.

Figure 11:
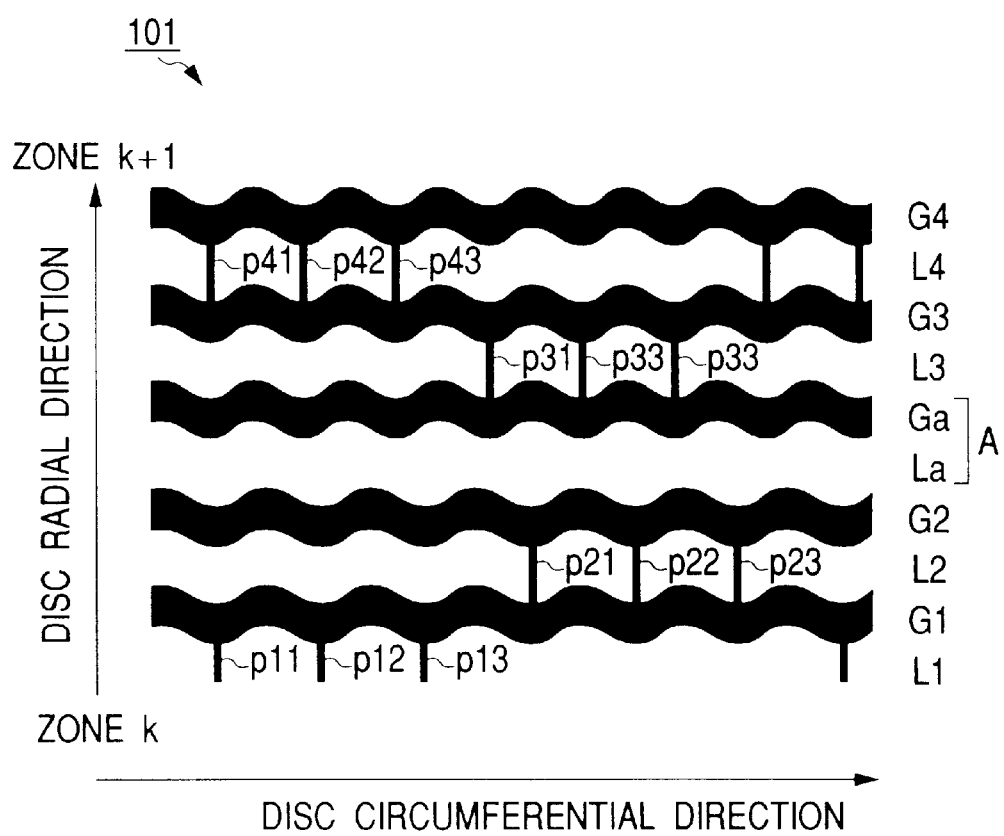
FIG. 11 is a diagram of a portion of an optical disc in a fifth embodiment of this invention.

FIG. 11 shows a portion of the optical disc 101 in the fifth embodiment of this invention. The optical disc 101 has zones among which only two zones "k" and "k+1" are shown in FIG. 11. The zone "k+1" neighbors the zone "k". Specifically, the zone "k+1" extends radially outward of the zone "k". The other zones are similar in design and structure to the zones "k" and "k+1". Accordingly, only the zones "k" and "k+1" will be described below in more detail.

Wobbling groove portions G1 and G2 extend in the zone "k". The groove portions G1 and G2 neighbor each other as viewed in a radial direction of the disc 101. Specifically, the groove portion G2 extends radially outward of the groove portion G1. The groove portion G2 is an outermost groove portion in the zone "k". The two sides of each of the groove portions G1 and G2 wobble. Only one of the two sides of each of the groove portions G1 and G2 may wobble. The wobbles of the groove portions G1 and G2 have equal phases. Land portions L1 and L2 extend in the zone "k". The land portion L1 is located between the groove portion G1 and an inwardly neighboring groove portion (not shown). The land portion L2 is located between the groove portions G1 and G2. The land portion L2 is an outermost land portion in the zone "k".

The land portion L1 is formed with groups each having prescribed locations (prescribed pre-pit locations) p11, p12, and p13 spaced at an interval equal to the period of the wobbles of the adjacent groove portions including the groove portion G1. The prescribed locations p11, p12, and p13 are assigned to pre-pits, respectively. As previously mentioned later, a pre-pit is present in or absent from each of the prescribed locations p11, p12, and p13. For example, the prescribed locations p11, p12, and p13 approximately coincide with positions at which the amplitude of the wobbles of the adjacent groove portions including the groove portion G1 peaks. Similarly, the land portion L2 is formed with groups each having prescribed locations p21, p22, and p23 spaced at an interval equal to the period of the wobbles of the groove portions G1 and G2. The prescribed locations p21, p22, and p23 are assigned to pre-pits, respectively. As previously mentioned later, a pre-pit is present in or absent from each of the prescribed locations p21, p22, and p23. For example, the prescribed locations p21, p22, and p23 approximately coincide with positions at which the amplitude of the wobbles of the groove portions G1 and G2 peaks.

The positions of the 3-pre-pit location groups on the land portion L1 are in a first phase along a circumferential direction of the disc 101. The positions of the 3-pre-pit location groups on the land portion L2 are in a second phase along the circumferential direction of the disc 101. The first phase and the second phase differ from each other. In other words, the circumferential positions (the angular positions) of the 3-pre-pit location groups on the land portion L1 differ from those of the 3-pre-pit location groups on the land portion L2. Specifically, the 3-pre-pit location groups on the land portion L1 alternate with the 3-pre-pit location groups on the land portion L2 as viewed in the circumferential direction of the disc 101.

Wobbling groove portions Ga, G3, and G4 extend in the zone "k+1". The groove portions Ga, G3, and G4 neighbor each other as viewed in the radial direction of the disc 101. Specifically, the groove portion G3 extends radially outward of the groove portion Ga. The groove portion G4 extends radially outward of the groove portion G3. The groove portion Ga is an innermost groove portion in the zone "k+1". The two sides of each of the groove portions Ga, G3, and G4 wobble. Only one of the two sides of each of the groove portions Ga, G3, and G4 may wobble. The wobbles of the groove portion Ga, G3, and G4 have equal phases. Land portions La, L3, and L4 extend in the zone "k+1". The land portion La is located between the groove portion Ga and the groove portion G2 in the zone "k". The land portion L3 is located between the groove portions Ga and G3. The land portion L4 is located between the groove portions G3 and G4. The land portion La is an innermost land portion in the zone "k+1".

The land portion L3 is formed with groups each having prescribed locations (prescribed pre-pit locations) p31, p32, and p33 spaced at an interval equal to the period of the wobbles of the groove portions Ga and G3. The prescribed locations p31, p32, and p33 are assigned to pre-pits, respectively. As previously mentioned later, a pre-pit is present in or absent from each of the prescribed locations p31, p32, and p33. For example, the prescribed locations p31, p32, and p33 approximately coincide with positions at which the amplitude of the wobbles of the groove portions Ga and G3 peaks. Similarly, the land portion L4 is formed with groups each having prescribed locations p41, p42, and p43 spaced at an interval equal to the period of the wobbles of the groove portions G3 and G4. The prescribed locations p41, p42, and p43 are assigned to pre-pits, respectively. As previously mentioned later, a pre-pit is present in or absent from each of the prescribed locations p41, p42, and p43. For example, the prescribed locations p41, p42, and p43 approximately coincide with positions at which the amplitude of the wobbles of the groove portions G3 and G4 peaks.

The positions of the 3-pre-pit location groups on the land portion L3 are in a third phase along a circumferential direction of the disc 101. The positions of the 3-pre-pit location groups on the land portion L4 are in a fourth phase along the circumferential direction of the disc 101. The third phase and the fourth phase differ from each other. In other words, the circumferential positions (the angular positions) of the 3-pre-pit location groups on the land portion L3 differ from those of the 3-pre-pit location groups on the land portion L4. Specifically, the 3-pre-pit location groups on the land portion L3 alternate with the 3-pre-pit location groups on the land portion L4 as viewed in the circumferential direction of the disc 101.

The 3 prescribed locations in each of the groups represent 3 bits, respectively. A pre-pit is present in or absent from each prescribed location. The presence of a pre-pit in the prescribed location represents a bit of "1". The absence of a pre-pit from the prescribed location represents a bit of "0". A unit data piece of "1" and a unit data piece of "0" are represented by different states of 3 bits corresponding to one 3-pre-pit location group.

Other portions of the optical disc 101 have 3-pre-pit location groups which are designed and arranged similarly to the previously-mentioned 3-pre-pit location groups. Specifically, 3-pre-pit location groups on a land portion alternate with 3-pre-pit location groups on a next land portion as viewed in the circumferential direction of the disc 101.

The period of the wobbles of the groove portions Ga, G3, and G4 in the zone "k+1" is shorter than that of the wobbles of the groove portions G1 and G2 in the zone "k". The innermost land portion La and the innermost groove portion Ga in the zone "k+1" compose a connection track "A" which extends along the boundary between the zones "k" and "k+1". Pre-pits are absent from the land portion La. Recorded digital information is absent from the groove portion Ga.

The optical disc 101 in the fifth embodiment of this invention provides advantages as follows. Since the wobbles of neighboring groove portions in a common zone of the optical disc 101 have equal phases, the distance between the neighboring groove portions is prevented from excessively decreasing. As previously mentioned, the circumferential positions (the angular positions) of 3-pre-pit location groups on a land portion differ from those of 3-pre-pit location groups on a next land portion. Pre-pits are absent from the innermost land portion La in the zone "k+1". Recorded digital information is absent from the innermost groove portion Ga in the zone "k+1". The innermost land portion La and the innermost groove portion Ga in the zone "k+1" compose the connection track "A" which extends along the boundary between the zones "k" and "k+1". Therefore, during a time interval at and around the shift of the currently-scanned on-disc position from the zone "k" to the zone "k+1", it is possible to prevent the occurrence of considerable cross-talks between a desired signal reproduced from the currently-scanned groove portion and signals on groove portions adjoining the currently-scanned groove portion. In addition, it is possible to accurately reproduce signal segments from the pre-pits p21, p22, p23, p31, p32, and p33.

The shift of the currently-scanned on-disc position from the zone "k" to the zone "k+1" means shift of the currently-scanned on-disc position from the longer-wobbling-period groove portions G1 and G2 to the shorter-wobbling-period groove portions Ga, G3, and G4. Upon the shift of the currently-scanned on-disc position from the zone "k" to the zone "k+1", the connection track "A" enables the signal reproduction from the disc 101 to suitably and quickly harmonize (synchronize) with the period of the wobble of the groove portion G3. Accordingly, digital information and signal segments can be reproduced from the groove portion G3 and the pre-pits p31, p32, and p33 without a considerable delay.

The previously-mentioned features of the fifth embodiment of this invention are suited especially for optical discs having relatively large track pitches.

Sixth Embodiment

Figure 12:
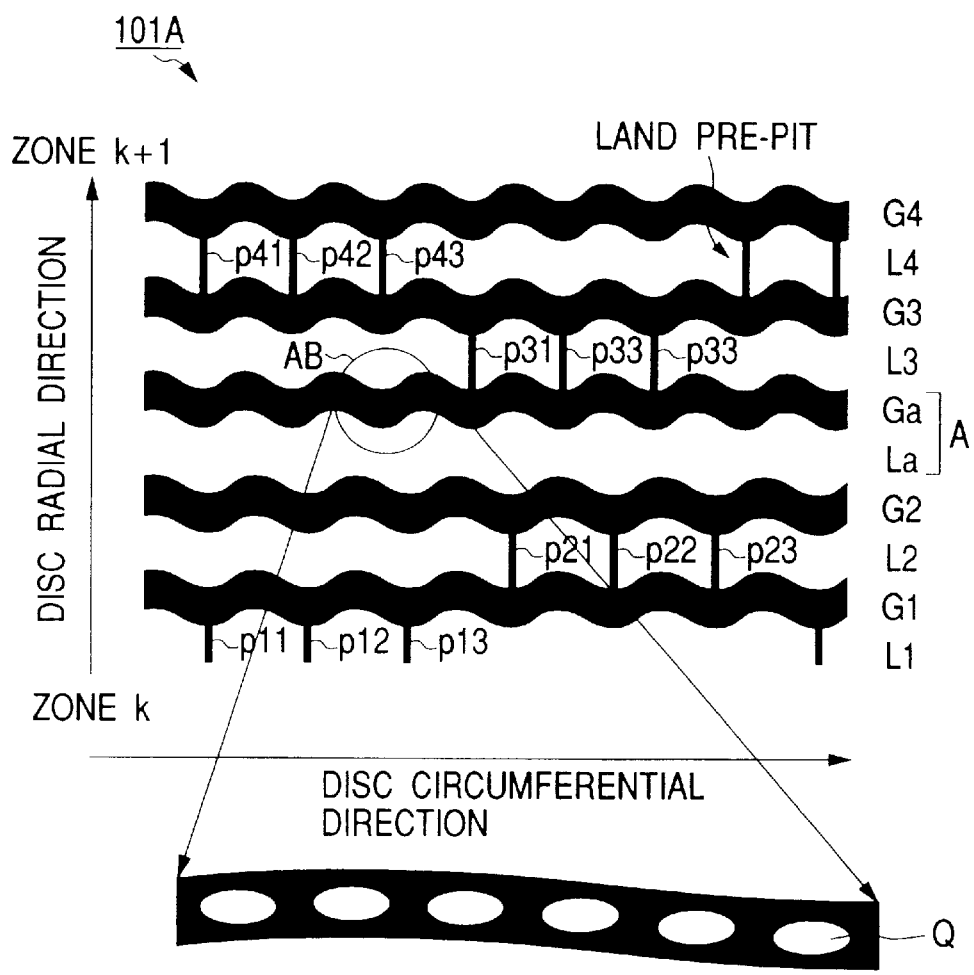
FIG. 12 is a diagram of a portion of an optical disc in a sixth embodiment of this invention.

FIG. 12 shows a portion of an optical disc 101A according to a sixth embodiment of this invention. The optical disc 101A is similar to the optical disc 101 (see FIG. 11) except for a design change mentioned below.

In the optical disc 101A of FIG. 12, a groove portion Ga in a connection track "A" has a region AB formed with pits representing single-frequency information. The circumferential position (the angular position) of the pit-added region AB of the groove portion Ga differs from that of each 3-pre-pit location group on a land portion L3. The single-frequency information represented by the pits in the region AB can be used as copy protecting information. For example, the copying of digital information recorded on an object optical disc may be permitted and prohibited when the single-frequency information is present in and absent from the object optical disc, respectively.

The single-frequency information may be replaced by modulated pit information represented by pits Q. For example, the modulated pit information results from MFM (modified frequency modulation) of a carrier frequency which does not affect main data to be recorded and reproduced. In this case, more added information can be recorded in addition to an indication of whether the pit information is present or absent.

Seventh Embodiment

Figure 13:
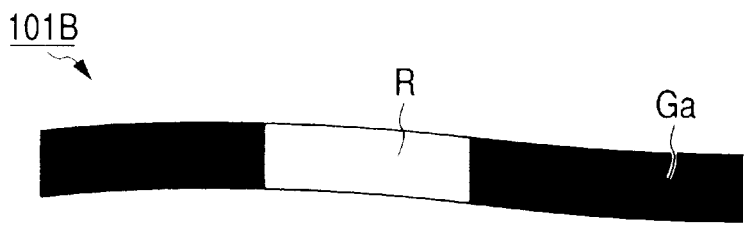
FIG. 13 is a diagram of a portion of an optical disc in a seventh embodiment of this invention.

FIG. 13 shows a portion of an optical disc 101B according to a seventh embodiment of this invention. The optical disc 101B is similar to the optical disc 101A (see FIG. 12) except for a design change mentioned below.

In the optical disc 101B of FIG. 13, a groove portion Ga in a connection track "A" has a region formed with a total reflection mirror R for reducing a tracking offset.

The total reflection mirror R may be combined with pits Q in the sixth embodiment of this invention.

Eighth Embodiment

An optical disc in an eighth embodiment of this invention is similar to the optical disc 101 (see FIG. 11) except for a design change mentioned below. In the optical disc of the eighth embodiment of this invention, a connection track "A" is formed in the zone "k" instead of the zone "k+1". The connection track "A" extends along the boundary between the zones "k" and "k+1".

Ninth Embodiment

An optical disc in a ninth embodiment of this invention is similar to the optical disc 101 (see FIG. 11) except that a connection track "A" is absent from each zone.

Tenth Embodiment

An optical disc of a tenth embodiment of this invention has an information recording area formed with a spiral of a wobbling groove and a spiral of a land. A portion of the land is located between neighboring portions of the groove. A groove portion and a pair of land portions adjoining the groove portion compose a track portion. Alternatively, the optical disc may have a set of concentric circular wobbling grooves and lands formed between neighboring grooves. Main digital information can be recorded on and reproduced from the groove (or the grooves). Auxiliary digital information (pre-pit signals or land pre-pit signals) is previously recorded on the land (or the lands). Specifically, the auxiliary information is represented by pre-pits formed in the land (or the lands). The auxiliary information is used for the recording of main information on the optical disc or the reproduction of main information therefrom.

The information recording area of the optical disc is divided into concentric annular zones. The recording of a wobble (main information) on each of the zones is implemented on a CAV basis, that is, a constant angular velocity basis. For example, the angular velocity remains constant regardless of zone. The angular velocity may be varied from zone to zone. Accordingly, the optical disc is of a ZCLV (zone constant linear velocity) type or a ZCAV (zone constant angular velocity) type. In each of the zones of the optical disc, the wobbles of groove portions which neighbor each other as viewed in a radial direction of the disc have equal phases.

Figure 14:
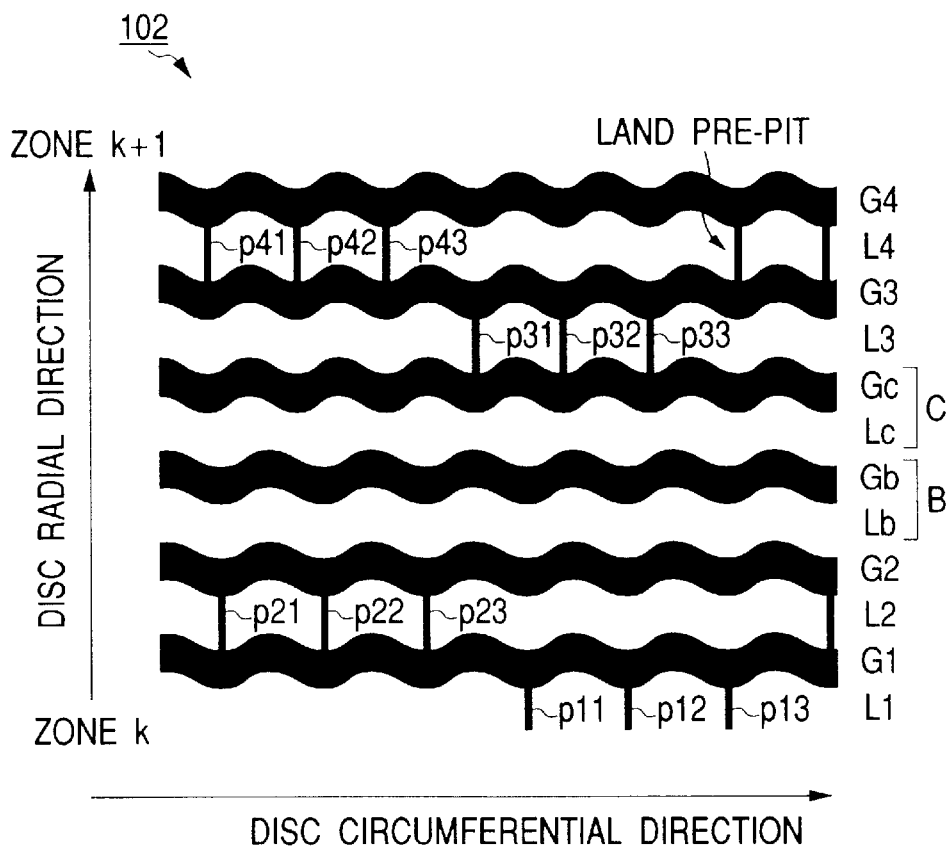
FIG. 14 is a diagram of a portion of an optical disc in a tenth embodiment of this invention.

FIG. 14 shows a portion of the optical disc 102 in the tenth embodiment of this invention. The optical disc 102 has zones among which only two zones "k" and "k+1" are shown in FIG. 14. The zone "k+1" neighbors the zone "k". Specifically, the zone "k+1" extends radially outward of the zone "k". The other zones are similar in design and structure to the zones "k" and "k+1". Accordingly, only the zones "k" and "k+1" will be described below in more detail.

Wobbling groove portions G1, G2, and Gb extend in the zone "k". The groove portions G1, G2, and Gb neighbor each other as viewed in a radial direction of the disc 102. Specifically, the groove portion G2 extends radially outward of the groove portion G1. The groove portion Gb extends radially outward of the groove portion G2. The groove portion Gb is an outermost groove portion in the zone "k". The two sides of each of the groove portions G1, G2, and Gb wobble. Only one of the two sides of each of the groove portions G1, G2, and Gb may wobble. The wobbles of the groove portions G1, G2, and Gb have equal phases. Land portions L1, L2, and Lb extend in the zone "k". The land portion L1 is located between the groove portion G1 and an inwardly neighboring groove portion (not shown). The land portion L2 is located between the groove portions G1 and G2. The land portion Lb is located between the groove portions G2 and Gb. The land portion Lb is an outermost land portion in the zone "k".

The land portion L1 is formed with groups each having prescribed locations (prescribed pre-pit locations) p11, p12, and p13 spaced at an interval equal to the period of the wobbles of the adjacent groove portions including the groove portion G1. The prescribed locations p11, p12, and p13 are assigned to pre-pits, respectively. As will be mentioned later, a pre-pit is present in or absent from each of the prescribed locations p11, p12, and p13. For example, the prescribed locations p11, p12, and p13 approximately coincide with positions at which the amplitude of the wobbles of the adjacent groove portions including the groove portion G1 peaks. Similarly, the land portion L2 is formed with groups each having prescribed locations p21, p22, and p23 spaced at an interval equal to the period of the wobbles of the groove portions G1 and G2. The prescribed locations p21, p22, and p23 are assigned to pre-pits, respectively. As will be mentioned later, a pre-pit is present in or absent from each of the prescribed locations p21, p22, and p23. For example, the prescribed locations p21, p22, and p23 approximately coincide with positions at which the amplitude of the wobbles of the groove portions G1 and G2 peaks.

The positions of the 3-pre-pit location groups on the land portion L1 are in a first phase along a circumferential direction of the disc 101. The positions of the 3-pre-pit location groups on the land portion L2 are in a second phase along the circumferential direction of the disc 101. The first phase and the second phase differ from each other. In other words, the circumferential positions (the angular positions) of the 3-pre-pit location groups on the land portion L1 differ from those of the 3-pre-pit location groups on the land portion L2. Specifically, the 3-pre-pit location groups on the land portion L1 alternate with the 3-pre-pit location groups on the land portion L2 as viewed in the circumferential direction of the disc 102.

Wobbling groove portions Gc, G3, and G4 extend in the zone "k+1". The groove portions Gc, G3, and G4 neighbor each other as viewed in the radial direction of the disc 102. Specifically, the groove portion G3 extends radially outward of the groove portion Gc. The groove portion G4 extends radially outward of the groove portion G3. The groove portion Gc is an innermost groove portion in the zone "k+1". The two sides of each of the groove portions Gc, G3, and G4 wobble. Only one of the two sides of each of the groove portions Gc, G3, and G4 may wobble. The wobbles of the groove portion Gc, G3, and G4 have equal phases. Land portions Lc, L3, and L4 extend in the zone "k+1". The land portion Lc is located between the groove portion Gc and the groove portion Gb in the zone "k". The land portion L3 is located between the groove portions Gc and G3. The land portion L4 is located between the groove portions G3 and G4. The land portion Lc is an innermost land portion in the zone "k+1".

The land portion L3 is formed with groups each having prescribed locations (prescribed pre-pit locations) p31, p32, and p33 spaced at an interval equal to the period of the wobbles of the groove portions Gc and G3. The prescribed locations p31, p32, and p33 are assigned to pre-pits, respectively. As previously mentioned, a pre-pit is present in or absent from each of the prescribed locations p31, p32, and p33. For example, the prescribed locations p31, p32, and p33 approximately coincide with positions at which the amplitude of the wobbles of the groove portions Gc and G3 peaks. Similarly, the land portion L4 is formed with groups each having prescribed locations p41, p42, and p43 spaced at an interval equal to the period of the wobbles of the groove portions G3 and G4. The prescribed locations p41, p42, and p43 are assigned to pre-pits, respectively. As previously mentioned, a pre-pit is present in or absent from each of the prescribed locations p41, p42, and p43. For example, the prescribed locations p41, p42, and p43 approximately coincide with positions at which the amplitude of the wobbles of the groove portions G3 and G4 peaks.

The positions of the 3-pre-pit location groups on the land portion L3 are in a third phase along a circumferential direction of the disc 102. The positions of the 3-pre-pit location groups on the land portion L4 are in a fourth phase along the circumferential direction of the disc 102. The third phase and the fourth phase differ from each other. In other words, the circumferential positions (the angular positions) of the 3-pre-pit location groups on the land portion L3 differ from those of the 3-pre-pit location groups on the land portion L4. Specifically, the 3-pre-pit location groups on the land portion L3 alternate with the 3-pre-pit location groups on the land portion L4 as viewed in the circumferential direction of the disc 102.

The 3 prescribed locations in each of the groups represent 3 bits, respectively. A pre-pit is present in or absent from each prescribed location. The presence of a pre-pit in the prescribed location represents a bit of "1". The absence of a pre-pit from the prescribed location represents a bit of "0". A unit data piece of "1" and a unit data piece of "0" are represented by different states of 3 bits corresponding to one 3-pre-pit location group.

Other portions of the optical disc 102 have 3-pre-pit location groups which are designed and arranged similarly to the previously- mentioned 3-pre-pit location groups. Specifically, 3-pre-pit location groups on a land portion alternate with 3-pre-pit location groups on a next land portion as viewed in the circumferential direction of the disc 102.

The period of the wobbles of the groove portions Gc, G3, and G4 in the zone "k+1" is shorter than that of the wobbles of the groove portions G1, G2, and Gb in the zone "k". The outermost groove portion Gb and the outermost land portion Lb in the zone "k" compose a connection track "B" which extends along the boundary between the zones "k" and "k+1". The innermost groove portion Gc and the innermost land portion Lc in the zone "k+1" compose a connection track "C" which extends along the boundary between the zones "k" and "k+1". Pre-pits are absent from the land portions Lb and Lc. Recorded digital information is absent from the groove portions Gb and Gc.

The optical disc 102 in the tenth embodiment of this invention provides advantages as follows. Since the wobbles of neighboring groove portions in a common zone of the optical disc 102 have equal phases, the distance between the neighboring groove portions is prevented from excessively decreasing. As previously mentioned, the circumferential positions (the angular positions) of 3-pre-pit location groups on a land portion differ from those of 3-pre-pit location groups on a next land portion. Pre-pits are absent from the outermost land portion Lb in the zone "k". Recorded digital information is absent from the outermost groove portion Gb in the zone "k". The outermost land portion Lb and the outermost groove portion Gb in the zone "k" compose the connection track "B" which extends along the boundary between the zones "k" and "k+1". Pre-pits are absent from the innermost land portion Lc in the zone "k+1". Recorded digital information is absent from the innermost groove portion Gc in the zone "k+1". The innermost land portion Lc and the innermost groove portion Gc in the zone "k+1" compose the connection track "C" which extends along the boundary between the zones "k" and "k+1". Therefore, during a time interval at and around the shift of the currently-scanned on-disc position from the zone "k" to the zone "k+1", it is possible to prevent the occurrence of considerable cross-talks between a desired signal reproduced from the currently-scanned groove portion and signals on groove portions adjoining the currently-scanned groove portion. In addition, it is possible to accurately reproduce signal segments from the pre-pits p21, p22, p23, p31, p32, and p33.

The previously-mentioned features of the tenth embodiment of this invention are suited especially for optical discs having relatively small track pitches.

Eleventh Embodiment

An eleventh embodiment of this invention relates to land pre-pit signals recorded on the optical discs in the fifth to tenth embodiments of this invention.

Figure 15:
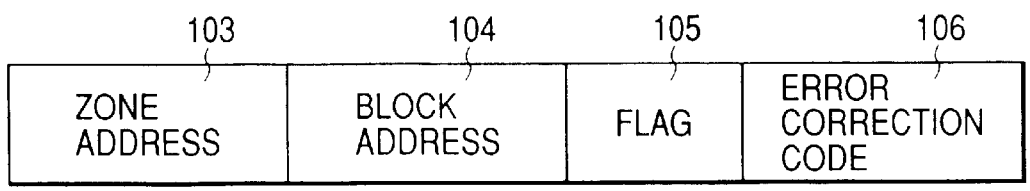
FIG. 15 is a diagram of the format of a land pre-pit signal in an eleventh embodiment of this invention.

FIG. 15 shows the format of one land pre-pit signal recorded on an optical disc. As shown in FIG. 15, one land pre-pit signal has a sequence of a zone address signal (zone address information or zone information) 103, a block address signal (block address information) 104, a flag-related signal 105, and an error correction code signal 106. Each land pre-pit signal results from subjecting an original signal to a predetermined modulation process. A disc maker previously records the. land pre-pit signal on the optical disc.

The zone address signal 103 indicates which of zones the related on-disc position exists in. The block address signal 104 indicates recording block positions in each segment. The flag-related signal 105 contains added information (auxiliary information) such as information about a connection track or connection tracks, information for controlling laser power, and information indicative of a disc serial number. The flag-related signal 105 may additionally contain information indicative of a table for detecting connection tracks in response to the block address signal 104. The error correction code signal 106 is used in correcting an error or errors in the reproduction of the related land pre-pit signal.

Twelfth Embodiment

Figure 16:
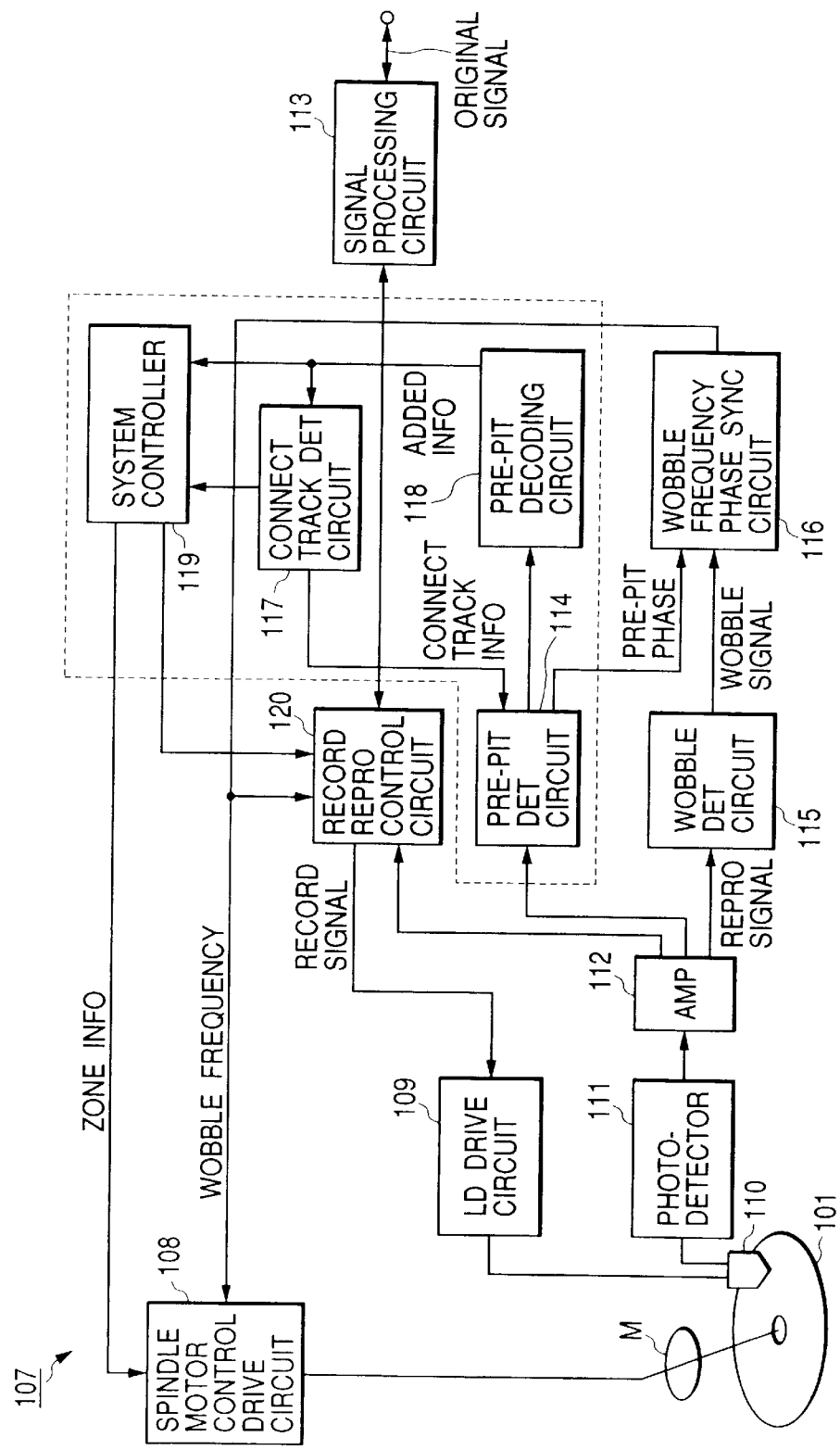
FIG. 16 is a block diagram of an information recording and reproducing apparatus according to a twelfth embodiment of this invention.

FIG. 16 shows a recording and reproducing apparatus 107 according to a twelfth embodiment of this invention. The recording and reproducing apparatus 107 operates on an optical disc 101 identical with that in the fifth embodiment of this invention (see FIG. 11).

The optical disc 101 is previously formed with 3-pre-pit location groups. Specifically, 3-pre-pit location groups on a land portion alternate with 3-pre-pit location groups on a next land portion as viewed in a circumferential direction of the disc 101. In a common zone of the optical disc 101, the wobbles of two groove portions which neighbor each other as viewed in a radial direction of the disc 101 have equal phases. In the optical disc 101, a connection track "A" is formed along each inter-zone boundary.

The recording and reproducing apparatus 107 includes a spindle motor M for rotating the optical disc 101, and a spindle-motor control and drive circuit 108 for controlling and driving the spindle motor M. The recording and reproducing apparatus 107 also includes an optical pickup 110.

During a recording mode of operation of the apparatus 107, the optical pickup 110 generates a laser beam in response to data inputted thereto, and applies the laser beam to the optical disc 101 and thereby records the inputted data on the optical disc 101. The laser beam is reflected by the optical disc 101 before returning to the optical pickup 110. The optical pickup 110, a photodetector 111, and an amplifier 112 convert the return laser beam into an electric signal containing data reproduced from the optical disc 101. In other words, the optical pickup 110 reproduces data from the optical disc 101.

During a reproducing mode of operation of the apparatus 107, the optical pickup 110 applies a laser beam to the optical disc 101 and receives a return laser beam therefrom. The optical pickup 110, the photodetector 111, and the amplifier 112 convert the return laser beam into an electric signal containing data reproduced from the optical disc 101. In other words, the optical pickup 110 reproduces data from the optical disc 101.

The recording and reproducing apparatus 107 further includes an LD drive circuit 109 for driving a laser in the optical pickup 110, and the photodetector 111 for converting a return laser beam, which comes from the optical disc 101, into a reproduced signal. Generally, the LD drive circuit 109 and the photodetector 111 are incorporated in the optical pickup 110.

The amplifier 112 receives the reproduced signal from the photodetector 111. The amplifier 112 amplifies the reproduced signal. The amplifier 112 outputs the amplification-resultant reproduced signal.

A signal processing circuit 113 subjects input data (an original information signal) to various types of signal processing such as transmission-line encoding, addition of an error correction code signal, and record-formatting. The signal processing circuit 113 outputs the processing-resultant data as a record information signal (an information signal to be recorded). The signal processing circuit 113 receives reproduced information. The signal processing circuit recovers an original information signal from the reproduced information.

A pre-pit detection circuit 114 receives the amplification-resultant reproduced signal from the amplifier 112. The pre-pit detection circuit 114 derives a land pre-pit signal from the amplification-resultant reproduced signal which corresponds to a currently-accessed groove portion of the optical disc 101. The pre-pit detection circuit 114 outputs the land pre-pit signal. The pre-pit detection circuit 114 receives connection-track information. The pre-pit detection circuit 114 responds to the connection-track information in deriving the land pre-pit signal.

A wobble detection circuit 115 receives the amplification-resultant reproduced signal from the amplifier 112. The wobble detection circuit 115 derives a wobble signal from the amplification-resultant reproduced signal. The wobble signal represents the wobble of the groove in the optical disc 101. The wobble detection circuit 115 outputs the wobble signal.

A wobble frequency phase sync circuit 116 receives the land pre-pit signal from the pre-pit detection circuit 114. The wobble frequency phase sync circuit 116 receives the wobble signal from the wobble detection circuit 115. The wobble frequency phase sync circuit 116 generates a wobble-frequency signal in response to the land pre-pit signal and the wobble signal. The wobble-frequency signal is equal in frequency to the wobble signal. The wobble-frequency signal is in phase with the land pre-pit signal. The wobble frequency phase sync circuit 116 outputs the wobble-frequency signal.

A connection-track detection circuit 117 detects connection-track information from the result of decoding the land pre-pit signal. The connection-track detection circuit 117 outputs the connection-track information.

A pre-pit decoding circuit 118 receives the land pre-pit signal from the pre-pit detection circuit 114. The pre-pit decoding circuit 118 decodes the land pre-pit signal into a decoding-resultant signal containing added information. The pre-pit decoding circuit 118 outputs the decoding-resultant signal. Specifically, the pre-pit decoding circuit 118 fees the decoding-resultant signal to the connection-track detection circuit 117.

A computer-based system controller 119 receives the decoding-resultant signal from the pre-pit decoding circuit 118. The system controller 119 receives the connection-track information from the connection-track detection circuit 117. The system controller 119 derives zone information and a signal representative of recording and reproducing control timings from the decoding-resultant signal and the connection-track information. The system controller 119 outputs the zone information and the control timing signal.

A recording and reproducing control circuit 120 receives the information signal from the signal processing circuit 113. The recording and reproducing control circuit 120 converts the information signal into a signal of a predetermined format for recording. The recording and reproducing control circuit 120 outputs the predetermined-format signal to the LD drive circuit 109 as a record signal (a signal to be recorded). The recording and reproducing control circuit 120 includes a clock signal generator which receives the wobble-frequency signal from the wobble frequency phase sync circuit 116. The clock signal generator multiplies the frequency of the wobble-frequency signal to generate a recording clock signal. The recording and reproducing control circuit 120 receives the control timing signal from the system controller 119. The recording and reproducing control circuit 120 controls the record signal in response to the recording clock signal and the control timing signal so that the record signal will be recorded on the groove of the optical disc 101 through the LD drive circuit 109 and the optical pickup 110, and that the signal recording will be implemented on a CAV (constant angular velocity) basis in each of zones of the optical disc 101. The recording and reproducing control circuit 120 receives the amplification-resultant reproduced signal from the amplifier 112. The recording and reproducing control circuit 120 subjects the amplification-resultant reproduced signal to a deformatting process for reproduction. The recording and reproducing control circuit 120 outputs the deformatting-resultant signal to the signal processing circuit 113 as reproduced information.

In the optical disc 101, information about each connection track "A" is contained in a flag-related signal (in a land pre-pit signal) recorded on a track portion which precedes or immediately precedes the connection track "A". The connection-track information reproduced from the optical disc 101 is fed to the system controller 119 from the connection-track detection circuit 117. The connection-track information may be fed to the system controller 119 from the pre-pit decoding circuit 118 as a portion of the added information. The system controller 119 detects the connection track "A" by referring to the connection-track information.

The system controller 119 may store a signal indicative of a table providing the relation between block address signals and connection tracks "A". In this case, the system controller 119 derives block address signals from the added information outputted by the pre-pit decoding circuit 118, and detects the connection tracks "A" in response to the block address signals by referring to the table.

During the recording mode of operation of the apparatus 107, the system controller 119 outputs the zone information to the spindle-motor control and drive circuit 108 while the wobble frequency phase sync circuit 116 outputs the wobble-frequency signal to the spindle-motor control and drive circuit 108. The spindle-motor control and drive circuit 108 controls and drives the spindle motor M in response to the zone information and the wobble-frequency signal. Accordingly, the rotation of the optical disc 101 is controlled in response to the zone information and the wobble-frequency signal.

During the recording mode of operation of the apparatus 107, the signal processing circuit 113 subjects input data (an original information signal) to the various types of signal processing such as transmission-line encoding, addition of an error correction code signal, and record-formatting. The signal processing circuit 113 outputs the processing-resultant data to the recording and reproducing control circuit 120. The wobble frequency phase sync circuit 116 outputs the wobble-frequency signal to the recording and reproducing control circuit 120. The system controller 119 outputs the control timing signal to the recording and reproducing control circuit 120. The recording and reproducing control circuit 120 converts the output data from the signal processing circuit 113 into the record signal in response to the wobble-frequency signal and the control timing signal. The recording and reproducing control circuit 120 outputs the record signal to the LD drive circuit 109. The record signal is recorded on the optical disc 101 via the LD drive circuit 109 and the optical pickup 110.

During the reproducing mode of operation of the apparatus 107, the system controller 119 outputs the zone information to the spindle-motor control and drive circuit 108 while the wobble frequency phase sync circuit 116 outputs the wobble-frequency signal to the spindle-motor control and drive circuit 108. The spindle-motor control and drive circuit 108 controls and drives the spindle motor M in response to the zone information and the wobble-frequency signal. Accordingly, the rotation of the optical disc 101 is controlled in response to the zone information and the wobble-frequency signal.

During the reproducing mode of operation of the apparatus 107, the optical pickup 110 applies a laser beam to the optical disc 101. The laser beam is reflected by the optical disc 101 before returning to the optical pickup 110. The photodetector 111 in the optical pickup 110 converts the return laser beam into a reproduced signal. The optical pickup 110 outputs the reproduced signal to the amplifier 112. The amplifier 112 amplifies the reproduced signal. The amplifier 112 outputs the amplification-resultant reproduced signal to the pre-pit detection circuit 114, the wobble detection circuit 115, and the recording and reproducing control circuit 120.

During the reproducing mode of operation of the apparatus 107, the pre-pit detection circuit 114 derives a land pre-pit signal from the amplification-resultant reproduced signal which corresponds to a currently-accessed groove portion of the optical disc 101. The pre-pit detection circuit 114 responds to the connection-track information in deriving the land pre-pit signal. The pre-pit detection circuit 114 outputs the land pre-pit signal to the wobble frequency phase sync circuit 116 and the pre-pit decoding circuit 118. The wobble detection circuit 115 derives a wobble signal from the amplification-resultant reproduced signal. The wobble detection circuit 115 outputs the wobble signal to the wobble frequency phase sync circuit 116. The wobble frequency phase sync circuit 116 generates a wobble-frequency signal in response to the land pre-pit signal and the wobble signal. The wobble-frequency signal is equal in frequency to the wobble signal. The wobble-frequency signal is in phase with the land pre-pit signal. The wobble frequency phase sync circuit 116 outputs the wobble-frequency signal to the spindle-motor control and drive circuit 108 and the recording and reproducing control circuit 120.

During the reproducing mode of operation of the apparatus 107, the pre-pit decoding circuit 118 decodes the land pre-pit signal into a decoding-resultant signal containing added information. The pre-pit decoding circuit 118 outputs the decoding-resultant signal (the added information) to the connection-track detection circuit 117 and the system controller 119. The connection-track detection circuit 117 detects connection-track information from the decoding-resultant signal. The connection-track detection circuit 117 outputs the connection-track information to the pre-pit detection circuit 114 and the system controller 119. The system controller 119 derives zone information and a control timing signal from the decoding-resultant signal and the connection-track information. The system controller 119 outputs the zone information to the spindle-motor control and drive circuit 108. The system controller 119 outputs the control timing signal to the recording and reproducing control circuit 120. The recording and reproducing control circuit 120 subjects the amplification-resultant reproduced signal to a reproduction deformatting process responsive to the wobble-frequency signal and the control timing signal. The recording and reproducing control circuit 120 outputs the deformatting-resultant signal to the signal processing circuit 113 as reproduced information. The signal processing circuit 113 subjects the reproduced information to various types of signal processing such as demodulation and error correction to recover an original information signal. The signal processing circuit 113 outputs the recovered information signal.

Figure 17:
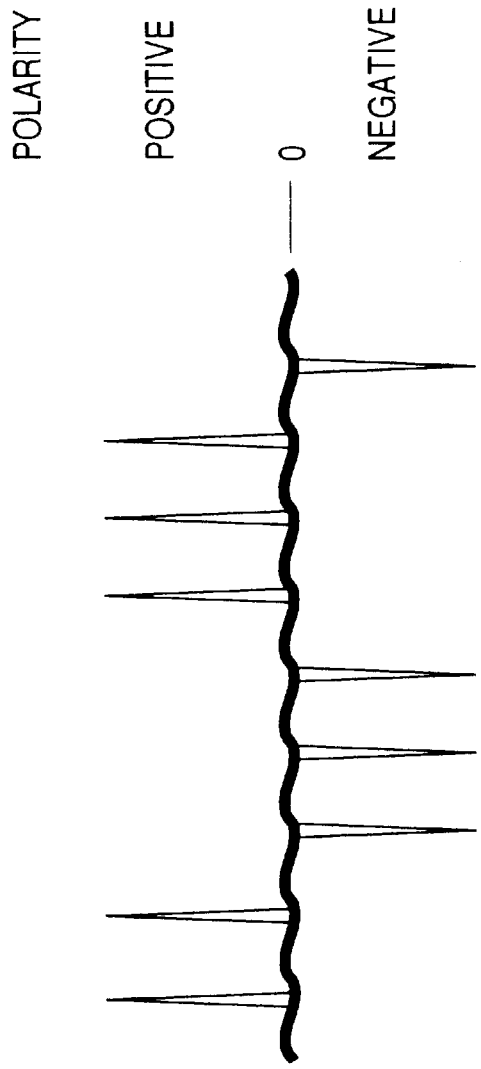
FIG. 17 is a diagram of an example of the waveform of a land pre-pit signal which is detected when one of track portions except connection tracks is scanned in the twelfth embodiment of this invention.

FIG. 17 shows an example of the waveform of a land pre-pit signal which is detected when one of track portions (normal track portions) except connection tracks "A" is scanned. Each normal track portion is composed of a groove portion, an inner land portion inwardly adjoining the groove portion, and an outer land portion outwardly adjoining the groove portion. Both of the inner and outer land portions have pre-pits. Pre-pits in the inner land portion cause negative-polarity components of the detected land pre-pit signal, while pre-pits in the outer land portion cause positive-polarity components of the detected land pre-pit signal. During the scanning of the normal track portion, the signal recording or the signal reproduction is controlled in response to the pre-pits in the inner land portion, that is, in response to the negative-polarity components of the detected land pre-pit signal.

Figure 18:
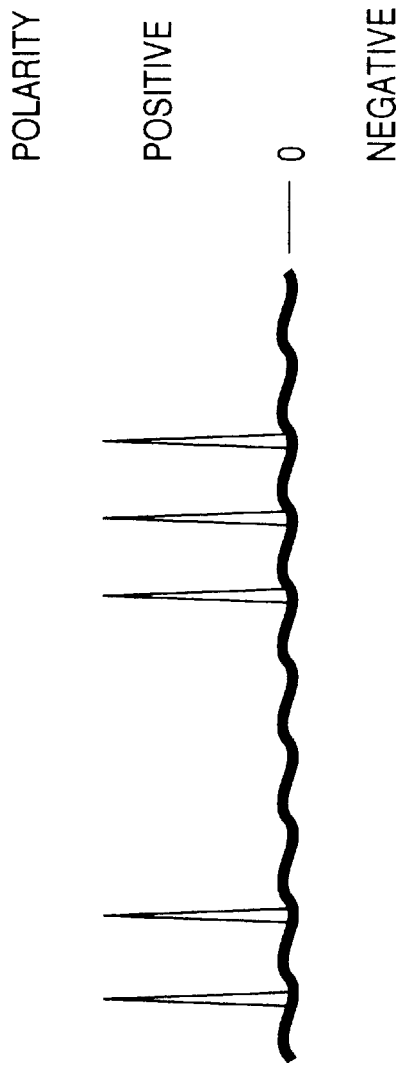
FIG. 18 is a diagram of an example of the waveform of a land pre-pit signal which is detected when a connection track is scanned in the twelfth embodiment of this invention.

FIG. 18 shows an example of the waveform of a land pre-pit signal which is detected when a connection track "A" is scanned. The connection track "A" is composed of a groove portion Ga and an inner land portion La inwardly adjoining the groove portion Ga (see FIG. 11). The inner land portion La is devoid of pre-pits. Accordingly, negative-polarity components are absent from the detected land pre-pit signal. There is an outer land portion L3 outwardly adjoining the groove portion Ga. The outer land portion L3 has pre-pits. Thus, the detected land pre-pit signal has positive-polarity components caused by the pre-pits in the outer land portion L3. The absence of negative-polarity components from the detected land pre-pit signal would cause the phase of the record signal to be undetermined, and would result in a delay of the start of recording. Such a problem is removed as follows. When the connection track "A" is scanned, the pre-pit detection circuit 114 inverts or reverses the polarity of the detected land pre-pit signal in response to the connection-track information fed from the connection-track detection circuit 117. Thus, in this case, the components of the detected land pre-pit signal which are caused by the pre-pits in the outer land portion L3 can be used as phase information. The phase information prevents the start of recording from being delayed upon the shift of the currently-scanned on-disc position from one zone to the next.

It should be noted that pre-pits in the inner land portion and pre-pits in the outer land portion in a normal track portion may correspond to positive-polarity components and negative-polarity components of the detected land pre-pit signal respectively.

As previously mentioned, the wobbles of neighboring groove portions in a common zone of the optical disc 101 have equal phases along a circumferential direction of the disc 101. Pre-pits are absent from the innermost land portion La in the zone "k+1". Recorded digital information is absent from the innermost groove portion Ga in the zone "k+1". The innermost land portion La and the innermost groove portion Ga in the zone "k+1" compose the connection track "A" which extends along the boundary between the zones "k" and "k+1". The phase of the wobble of the groove portion Ga in the connection track "A" is equal to the phase of the wobbles of the other groove portions in the zone "k+1" which contains the connection track "A". Therefore, during a time interval at and around the shift of the currently-scanned on-disc position from the zone "k" to the zone "k+1", it is possible to prevent the occurrence of considerable cross-talks between a desired signal reproduced from the currently-scanned groove portion and signals on groove portions adjoining the currently-scanned groove portion. In addition, it is possible to accurately reproduce signal segments from the pre-pits p21, p22, p23, p31, p32, and p33 in the land portions L2 and L3 near the connection track "A". When the connection track "A" is scanned, the pre-pit detection circuit 114 inverts or reverses the polarity of the detected land pre-pit signal in response to the connection-track information fed from the connection-track detection circuit 117. Thus, in this case, the components of the detected land pre-pit signal which are caused by the pre-pits in the outer land portion L3 can be used as phase information. The phase information prevents the start of recording from being delayed upon the shift of the currently-scanned on-disc position from the zone "k" to the zone "k+1".

It should be noted that the optical disc 101 may be replaced by one of the optical discs 101A, 101B, and 102.

Thirteenth Embodiment

An optical disc in a thirteenth embodiment of this invention is similar to one of the optical discs 101, 101A, 101B, and 102 except that J-pre-pit location groups replace the 3-pre-pit location groups. Here, J denotes a predetermined natural number different from 3.

Fourteenth Embodiment

An optical disc in a fourteenth embodiment of this invention is similar to the optical disc 102 except that three or more connection tracks are formed along each inter-zone boundary.

What is claimed is:

1. An optical disc having an information recording portion, the information recording portion having a spiral of a groove, the information recording portion having land portions located between portions of the groove which neighbor each other as viewed in a disc radial direction, wherein auxiliary information used when an information signal is recorded on and reproduced from the groove is previously recorded on the land portions, wherein the auxiliary information is represented by pre-pits provided in the land portions, wherein the information recording portion is divided into a plurality of zones as viewed in the disc radial direction, wherein in each of the zones, at least one of two sides of the groove wobbles at a fixed frequency in accordance with a constant angular velocity system, and wherein in each of the zones, phases of wobbles of respective neighboring portions of the groove are equal to each other, and the neighboring portions of the groove neighbor each other as viewed in the disc radial direction.

2. An optical disc as recited in claim 1, wherein the pre-pits are at positions having approximately a fixed relation with a period of the wobble of the groove, wherein groups each having a predetermined number of pre-pit locations represent bit data values containing addresses of the zones, and wherein a pre-pit is present in or absent from each of the pre-pit locations.

3. An optical disc as recited in claim 2, wherein the groups in first one of the land portions are at first positions, and the groups in second one of the land portions are at second positions, wherein the first one of the land portions and the second one of the land portions neighbor each other as viewed in the disc radial direction, and wherein a phase of the first positions differ from a phase of the second positions as viewed along a disc circumferential direction.

4. An optical disc as recited in claim 2, wherein the groups have first groups each representing a bit data value of "1" and second groups each representing a bit data value of "0", wherein each of the first groups and each of the second groups are equal in number of pre-pits per group, and wherein each of the first groups and each of the second groups are different in arrangement of pre-pits per group.

5. An optical disc as recited in claim 1, wherein the frequency "fw" of the wobble of the groove and a channel bit clock frequency "fp" of the information signal are in a relation as follows:

$$fp = N \cdot fw$$

where N denotes a natural number.

6. An optical disc as recited in claim 1, wherein as the zone changes from one to the next in a disc radially outward direction, a number of cycles of the wobble increases by a predetermined natural number and an amount of the information signal increases by a predetermined number of recording units.

7. An optical disc as recited in claim 1, wherein the information recording portion is divided into a plurality of sectorial segments of equal angular sizes, and wherein as the zone changes from one to the next in a disc radially outward direction, a number of cycles of the wobble per sectorial segment increases by a predetermined natural number and an amount of the information signal per sectorial segment increases by a predetermined number of recording units.

8. An apparatus for recording digital information on an optical disc having an information recording portion, the information recording portion having a spiral of a groove, the information recording portion having land portions located between portions of the groove which neighbor each other as viewed in a disc radial direction, wherein auxiliary information used when an information signal is recorded on and reproduced from the groove is previously recorded on the land portions, wherein the auxiliary information is represented by pre-pits provided in the land portions, wherein the information recording portion is divided into a plurality of zones as viewed in the disc radial direction, wherein in each of the zones, at least one of two sides of the groove wobbles at a fixed frequency "fw" in accordance with a constant angular velocity system, wherein in each of the zones, phases of wobbles of respective neighboring portions of the groove are equal to each other, and the neighboring portions of the groove neighbor each other as viewed in the disc radial direction, and wherein the wobble frequency "fw" and a channel bit clock frequency "fp" of the information signal are in a relation as follows:

$$fp = N \cdot fw$$

where N denotes a natural number, the apparatus comprising:

signal reproducing means for reproducing a signal from the optical disc to generate a reproduced signal;

pre-pit reproducing means for detecting the pre-pits in response to the reproduced signal, and generating a pre-pit signal representative of the detected pre-pits;

wobble reproducing means for detecting the wobble in response to the reproduced signal, and generating a wobble signal representative of the detected wobble;

clock generating means for generating a recording clock signal in response to the pre-pit signal and the wobble signal;

zone address generating means for generating zone address information representative of addresses of the zones in response to the pre-pit signal; and recording means for recording an information signal on the groove in synchronism with the recording clock signal and in response to the zone address information and a reference clock signal having a frequency related to the wobble frequency, wherein the recording of the information signal is in accordance with a constant angular velocity system in each of the zones.

9. An apparatus for reproducing digital information from an optical disc having an information recording portion, the information recording portion having a spiral of a groove, the information recording portion having land portions located between portions of the groove which neighbor each other as viewed in a disc radial direction, wherein auxiliary information used when an information signal is recorded on and reproduced from the groove is previously recorded on the land portions, wherein the auxiliary information is represented by pre-pits provided in the land portions, wherein the information recording portion is divided into a plurality of zones as viewed in the disc radial direction, wherein in each of the zones, at least one of two sides of the groove wobbles at a fixed frequency, "fw" in accordance with a constant angular velocity system, wherein in each of the zones, phases of wobbles of respective neighboring portions of the groove are equal to each other, and the neighboring portions of the groove neighbor each other as viewed in the disc radial direction, and wherein the wobble frequency "fw" and a channel bit clock frequency "fp" of the information signal are in a relation as follows:

$$fp = N \cdot fw$$

where N denotes a natural number, the apparatus comprising:
   signal reproducing means for reproducing a signal from the optical disc to generate a reproduced signal;
   pre-pit reproducing means for detecting the pre-pits in response to the reproduced signal, and generating a pre-pit signal representative of the detected pre-pits;
   zone address generating means for generating zone address information representative of addresses of the zones in response to the pre-pit signal; and
   information reproducing means for reproducing an information signal from the groove in response to the zone address information and a reference clock signal having a frequency related to the wobble frequency, wherein the reproduction of the information signal is in accordance with a constant angular velocity system in each of the zones.

10. An optical disc having an information recording portion, the information recording portion having concentric grooves, the information recording portion having lands located between the grooves, wherein auxiliary information used when an information signal is recorded on and reproduced from the grooves is previously recorded on the lands, wherein the auxiliary information is represented by pre-pits provided in the lands, wherein the information recording portion is divided into a plurality of zones as viewed in a disc radial direction, wherein in each of the zones, at least one of two sides of each of the grooves wobbles at a fixed frequency in accordance with a constant angular velocity system, and wherein in each of the zones, phases of wobbles of neighboring ones of the grooves are equal to each other.

11. An optical disc having an information recording portion, the information recording portion having a spiral of a groove, the information recording portion having land portions located between portions of the groove which neighbor each other as viewed in a disc radial direction, wherein auxiliary information used when an information signal is recorded on and reproduced from the groove is previously recorded on the land portions, wherein the auxiliary information is represented by pre-pits provided in the land portions, wherein the information recording portion is divided into a plurality of zones as viewed in the disc radial direction, wherein in each of the zones, at least one of two sides of the groove wobbles at a fixed frequency in accordance with a constant angular velocity system, and wherein in each of the zones, phases of wobbles of respective neighboring portions of the groove are equal to each other, and the neighboring portions of the groove neighbor each other as viewed in the disc radial direction, the optical disc further having at least one connection track extending in one of two neighboring zones among the zones and along a boundary between the two neighboring zones, the connection track including a portion among the portions of the groove and a land portion among the land portions, wherein the land portion in the connection track is devoid of pre-pits, and the portion of the groove in the connection track is equal in wobble cycle and wobble phase to portions of the groove in the zone containing the connection track.

12. An optical disc as recited in claim 11, wherein the portion of the groove in the connection track includes at least one of a total reflection mirror region and a region representative of predetermined pit information.

13. An apparatus for recording and reproducing digital information on and from an optical disc having an information recording portion, the information recording portion having a spiral of a groove, the information recording portion having land portions located between portions of the groove which neighbor each other as viewed in a disc radial direction, wherein auxiliary information used when an information signal is recorded on and reproduced from the groove is previously recorded on the land portions, wherein the auxiliary information is represented by pre-pits provided in the land portions, wherein the information recording portion is divided into a plurality of zones as viewed in the disc radial direction, wherein in each of the zones, at least one of two sides of the groove wobbles at a fixed frequency in accordance with a constant angular velocity system, and wherein in each of the zones, phases of wobbles of respective neighboring portions of the groove are equal to each other, and the neighboring portions of the groove neighbor each other as viewed in the disc radial direction, the optical disc further having at least one connection track extending in one of two neighboring zones among the zones and along a boundary between the two neighboring zones, the connection track including a portion among the portions of the groove and a land portion among the land portions, wherein the land portion in the connection track is devoid of pre-pits, and the portion of the groove in the connection track is equal in wobble cycle and wobble phase to portions of the groove in the zone containing the connection track, the apparatus comprising:
   reproducing means for reproducing a signal from the optical disc to generate a reproduced signal;
   pre-pit detecting means for detecting a pre-pit signal from the reproduced signal, the pre-pit signal representing the pre-pits;
   pre-pit decoding means for decoding the pre-pit signal detected by the pre-pit detecting means into original pre-pit information; and
   connection track detecting means for detecting a connection track in response to the original pre-pit information generated by the pre-pit decoding means, and generating connection track information representative of the detected connection track.

14. An apparatus as recited in claim 13, further comprising means for inverting a polarity of the pre-pit signal in response to the connection track information.

15. An optical disc having an information recording portion, the information recording portion having concentric grooves, the information recording portion having lands located between the grooves, wherein auxiliary information used when an information signal is recorded on and reproduced from the grooves is previously recorded on the lands, wherein the auxiliary information is represented by pre-pits provided in the lands, wherein the information recording portion is divided into a plurality of zones as viewed in a disc radial direction, wherein in each of the zones, at least one of two sides of each of the grooves wobbles at a fixed frequency in accordance with a constant angular velocity system, and wherein in each of the zones, phases of wobbles of neighboring ones of the grooves are equal to each other, the optical disc further having at least one connection track extending in one of two neighboring zones among the zones and along a boundary between the two neighboring zones, the connection track including a groove among the grooves and a land among the lands, wherein the land in the connection track is devoid of pre-pits, and the groove in the connection track is equal in wobble cycle and wobble phase to the grooves in the zone containing the connection track.

16. An apparatus for recording digital information on an optical disc having an information recording portion, the information recording portion having concentric grooves, the information recording portion having lands located between the grooves, wherein auxiliary information used when an information signal is recorded on and reproduced from the grooves is previously recorded on the lands, wherein the auxiliary information is represented by pre-pits provided in the lands, wherein the information recording portion is divided into a plurality of zones as viewed in a disc radial direction, wherein in each of the zones, at least one of two sides of each of the grooves wobbles at a fixed frequency "fw" in accordance with a constant angular velocity system, wherein in each of the zones, phases of wobbles of neighboring ones of the grooves are equal to each other, and wherein the wobble frequency "fw" and a channel bit clock frequency "fp" of the information signal are in a relation as follows:

$$fp = N \cdot fw$$

where N denotes a natural number, the apparatus comprising:

signal reproducing means for reproducing a signal from the optical disc to generate a reproduced signal;

pre-pit reproducing means for detecting the pre-pits in response to the reproduced signal, and generating a pre-pit signal representative of the detected pre-pits;

wobble reproducing means for detecting the wobble in response to the reproduced signal, and generating a wobble signal representative of the detected wobble;

clock generating means for generating a recording clock signal in response to the pre-pit signal and the wobble signal;

zone address generating means for generating zone address information representative of addresses of the zones in response to the pre-pit signal; and recording means for recording an information signal on the grooves in synchronism with the recording clock signal and in response to the zone address information and a reference clock signal having a frequency related to the wobble frequency, wherein the recording of the information signal is in accordance with a constant angular velocity system in each of the zones.

17. An apparatus for reproducing digital information from an optical disc having an information recording portion, the information recording portion having concentric grooves, the information recording portion having lands located between the grooves, wherein auxiliary information used when an information signal is recorded on and reproduced from the grooves is previously recorded on the lands, wherein the auxiliary information is represented by pre-pits provided in the lands, wherein the information recording portion is divided into a plurality of zones as viewed in a disc radial direction, wherein in each of the zones, at least one of two sides of each of the grooves wobbles at a fixed frequency "fw" in accordance with a constant angular velocity system, wherein in each of the zones, phases of wobbles of neighboring ones of the grooves are equal to each other, and wherein the wobble frequency "fw" and a channel bit clock frequency "fp" of the information signal are in a relation as follows:

$$fp = N \cdot fw$$

where N denotes a natural number, the apparatus comprising:

signal reproducing means for reproducing a signal from the optical disc to generate a reproduced signal;

pre-pit reproducing means for detecting the pre-pits in response to the reproduced signal, and generating a pre-pit signal representative of the detected pre-pits;

zone address generating means for generating zone address information representative of addresses of the zones in response to the pre-pit signal; and information reproducing means for reproducing an information signal from the grooves in response to the zone address information and a reference clock signal having a frequency related to the wobble frequency, wherein the reproduction of the information signal is in accordance with a constant angular velocity system in each of the zones.

18. An apparatus for recording and reproducing digital information on and from an optical disc having an information recording portion, the information recording portion having concentric grooves, the information recording portion having lands located between the grooves, wherein auxiliary information used when an information signal is recorded on and reproduced from the grooves is previously recorded on the lands, wherein the auxiliary information is represented by pre-pits provided in the lands, wherein the information recording portion is divided into a plurality of zones as viewed in a disc radial direction, wherein in each of the zones, at least one of two sides of each of the grooves wobbles at a fixed frequency in accordance with a constant angular velocity system, and wherein in each of the zones, phases of wobbles of neighboring ones of the grooves are equal to each other, the optical disc further having at least one connection track extending in one of two neighboring zones among the zones and along a boundary between the two neighboring zones, the connection track including a groove among the grooves and a land among the lands, wherein the land in the connection track is devoid of pre-pits, and the groove in the connection track is equal in wobble cycle and wobble phase to grooves in the zone containing the connection track, the apparatus comprising:

reproducing means for reproducing a signal from the optical disc to generate a reproduced signal;

pre-pit detecting means for detecting a pre-pit signal from the reproduced signal, the pre-pit signal representing the pre-pits;

pre-pit decoding means for decoding the pre-pit signal detected by the pre-pit detecting means into original pre-pit information; and connection track detecting means for detecting a connection track in response to the original pre-pit information generated by the pre-pit decoding means, and generating connection track information representative of the detected connection track.

* * * * *